US 8,994,684 B2

(12) United States Patent
Lee

(10) Patent No.: US 8,994,684 B2
(45) Date of Patent: Mar. 31, 2015

(54) METHOD OF DETECTING A TOUCH IMAGE AND DISPLAY APPARATUS FOR PERFORMING THE SAME

(75) Inventor: Hui-Sung Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 912 days.

(21) Appl. No.: 13/006,573

(22) Filed: Jan. 14, 2011

(65) Prior Publication Data

US 2011/0181544 A1    Jul. 28, 2011

(30) Foreign Application Priority Data

Jan. 27, 2010  (KR) .............................. 2010-0007555

(51) Int. Cl.
*G06F 3/045* (2006.01)
*G06F 3/042* (2006.01)
*G06F 3/041* (2006.01)

(52) U.S. Cl.
CPC .............. *G06F 3/042* (2013.01); *G06F 3/0416* (2013.01)
USPC ......................................... 345/174; 345/173

(58) Field of Classification Search
USPC ................... 345/175, 174, 173; 178/18.01
See application file for complete search history.

(56) References Cited

U.S. PATENT DOCUMENTS

| | | | |
|---|---|---|---|
| 2005/0219229 A1* | 10/2005 | Yamaguchi | 345/173 |
| 2006/0132463 A1* | 6/2006 | Lee et al. | 345/173 |
| 2008/0055494 A1 | 3/2008 | Cernasov | |
| 2008/0186289 A1* | 8/2008 | Ijima et al. | 345/175 |
| 2009/0073141 A1* | 3/2009 | Chino | 345/175 |
| 2009/0200088 A1 | 8/2009 | Chuang | |

FOREIGN PATENT DOCUMENTS

| | | |
|---|---|---|
| JP | 2006-317682 A | 11/2006 |
| JP | 2007-065508 A | 3/2007 |
| JP | 2007-179000 A | 7/2007 |
| JP | 2009-211938 A | 9/2009 |
| JP | 2009-212964 A | 9/2009 |
| KR | 1020040090376 A | 11/2004 |
| KR | 1020060028538 A | 3/2006 |
| KR | 1020090067376 A | 6/2009 |
| KR | 1020090084644 A | 8/2009 |

* cited by examiner

Primary Examiner — Quan-Zhen Wang
Assistant Examiner — Yuk Chow
(74) Attorney, Agent, or Firm — Cantor Colburn LLP

(57) ABSTRACT

A method of detecting a touch image includes; driving a light source to detect a first touch information corresponding to a first light amount sensed by a first sensing section connected to odd-numbered gate lines, during an odd-numbered frame, and driving the light source to detect a second touch information corresponding to a second light amount sensed by a second sensing section connected to even-numbered gate lines, during an even-numbered frame, and detecting a touch image using the first touch information and the second touch information, so that influences from external light is reduced.

18 Claims, 13 Drawing Sheets

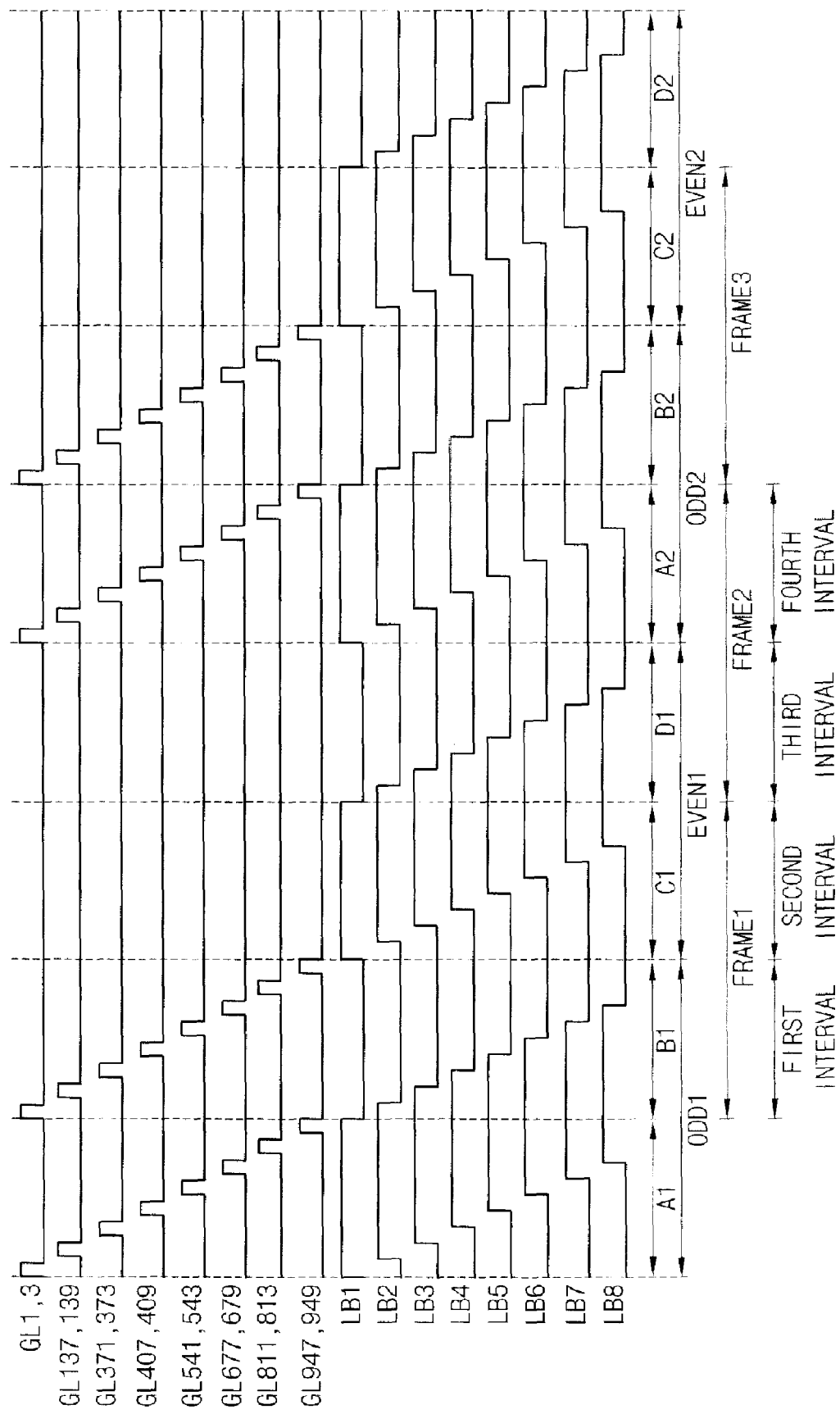

METHOD OF DETECTING A TOUCH IMAGE AND DISPLAY APPARATUS FOR PERFORMING THE SAME

This application claims to Korean Patent Application No. 2010-7555, filed on Jan. 27, 2010, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a method of detecting a touch image and a display apparatus for performing the method. More particularly, exemplary embodiments of the present invention relate to a method of detecting a touch image wherein the influenced of externally provided light is significantly reduced or eliminated and a display apparatus for performing the method.

2. Description of the Related Art

Recently, a display apparatus to which information is input using light has been developed. The display apparatus typical includes a display unit and a light source unit.

A display panel of the display unit typically includes an array substrate having a thin-film transistor and a pixel electrode, an opposite substrate opposite to the array substrate having a common electrode and a liquid crystal layer interposed between the array substrate and the opposite substrate. In addition, the array substrate or the opposite substrate may include sensing elements capable of recognizing light.

The light unit may include a visible light-emitting diode ("V-LED") or a fluorescent lamp for generating a visible wavelength light (Visible light) and an infrared light-emitting diode ("IR LED") for generating an infrared wavelength light ("IR light") as a light source which provides the display panel with light.

For example, the opposite substrate may include an IR transistor sensing the IR light and a visible transistor sensing the Visible light. Thus, the display apparatus may operate in a touch detecting mode using the IR light sensitive transistor and in a scanning mode using the visible light sensitive transistor.

In the touch detecting mode, the IR transistor may be driven by the IR light provided from the light source unit to be reflected by an object, and the visible transistor may be driven by external light provided from outside. In the scanning mode, the visible transistor may be driven by the Visible light provided from the light source unit to be reflected by the object.

However, in the touch detecting mode, when an amount of the external light is small, the IR transistor may detect the touch input. In addition, when the amount of the external light is large, the IR transistor may detect the touch input. However, when the amount of the external light is similar to the amount of the IR light, the IR transistor may not accurately detect the touch input.

BRIEF SUMMARY OF THE INVENTION

Exemplary embodiments of the present invention provide a method of detecting a touch image wherein influence of an external light is greatly reduced or effectively prevented.

Exemplary embodiments of the present invention also provide a display apparatus for performing the above-mentioned method.

According to one aspect of the present invention, there is provided an exemplary embodiment of a method of detecting a touch image. In the method, a light source is driven to detect a first touch information corresponding to a first light amount sensed by a first sensing section connected to odd-numbered gate lines during an odd-numbered frame. The light source is driven to detect a second touch information corresponding to a second light amount sensed by a second sensing section connected to even-numbered gate lines during an even-numbered frame. A touch image is detected using the first touch information and the second touch information.

According to another aspect of the present invention, an exemplary embodiment of a display apparatus includes; a touch display panel, a light source part, a sensing driving section and a touch image detecting section. The touch display panel includes a touch substrate and a display substrate. The touch substrate includes a first sensing section connected to odd-numbered gate lines and a second sensing section connected to even-numbered gate lines. The light source part includes a light source driving part to drive the light source during an odd-numbered frame and an even-numbered frame sequent to the odd-numbered frame. The sensing driving section drives the odd-numbered gate lines during the odd-numbered frame to read out a first light amount sensed by the first sensing section, and drives the even-numbered gate lines during the even-numbered frame to read out a second light amount sensed by the second sensing section. The touch image detecting section detects a first touch information corresponding to the first light amount, a second touch information corresponding to the second light amount, and a touch image using the first touch information and the second touch information.

According to some exemplary embodiments of the present invention, light amounts sensed by sensing elements are driven in the interlaced method, in which the odd-numbered sensing gate lines connected to the first sensing gate driving part are sequentially driven and then the even-numbered sensing gate lines connected to the second gate driving part are sequentially driven, thereby reducing influence from external light.

BRIEF DESCRIPTION OF THE DRAWINGS

The above and other features and advantages of the present invention will become more apparent by describing in detailed exemplary embodiments thereof with reference to the accompanying drawings, in which:

FIG. 6A is a timing diagram illustrating a method in which the exemplary embodiment of a display apparatus of FIG. 1 detects a first touch information during an odd-numbered frame;

DETAILED DESCRIPTION OF THE INVENTION

Figure 1:
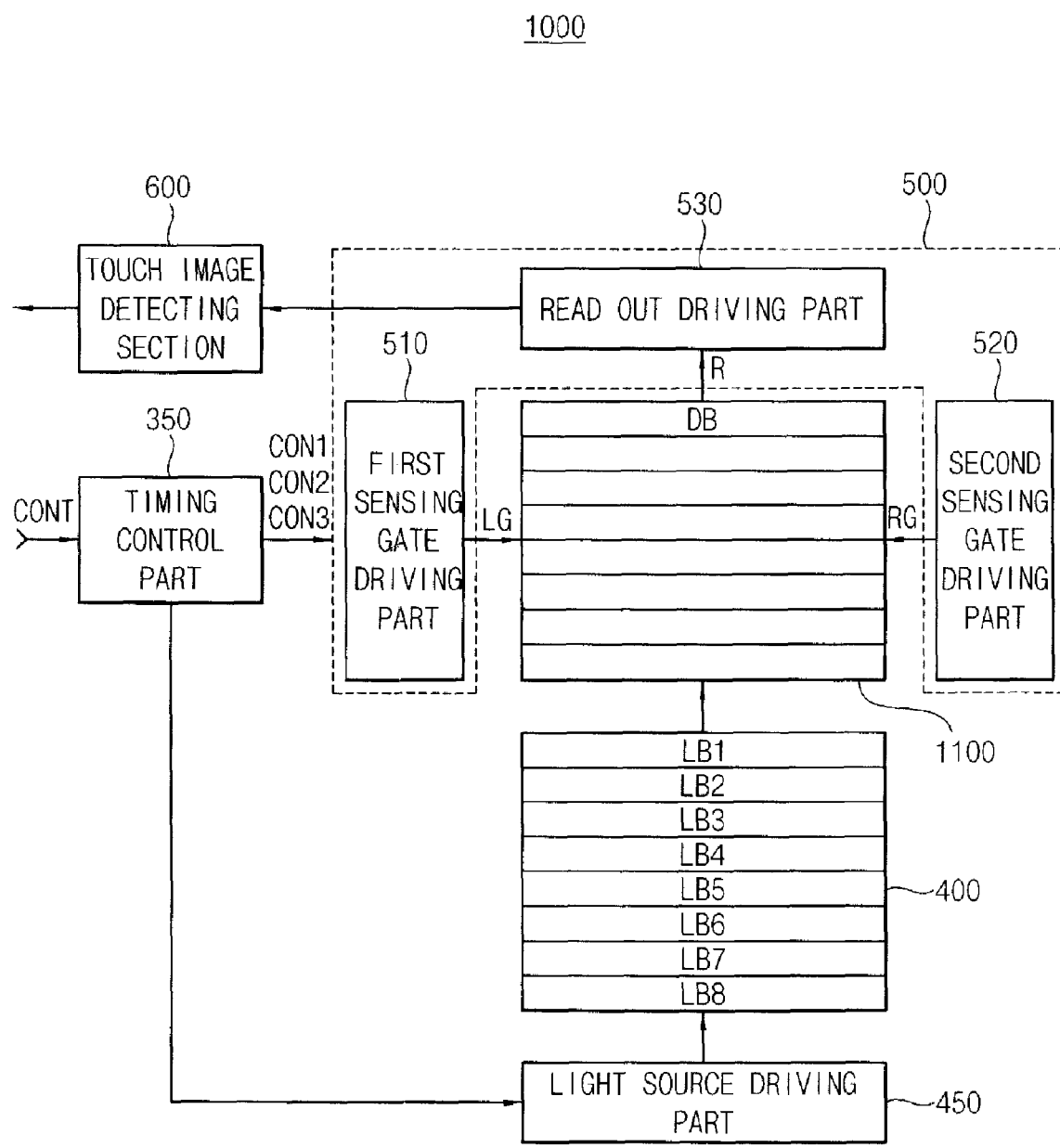
FIG. 1 is a block diagram schematically illustrating an exemplary embodiment of a display apparatus according to the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the present invention will be explained in detail with reference to the accompanying drawings.

FIG. 1 is a block diagram schematically illustrating an exemplary embodiment of a display apparatus according to the present invention.

Referring to FIG. 1, an exemplary embodiment of a display apparatus 1000 includes a touch display panel 1100, a timing control part 350, a light source part 400, a light source driving part 450, a sensing driving section 500 and a touch image detecting section 600.

The sensing driving section 500 includes a first sensing gate driving part 510, a second sensing gate driving part 520 and a read out driving part 530. The first and the second sensing gate driving parts 510 and 520 are connected to the touch display panel 1100 to provide the touch display panel 1100 with sensing gate signals LG and RG as will be described in more detail below. The touch display panel 1100 is driven in response to the sensing gate signals LG and RG to provide the read out driving part 530 with a read out signal R.

The timing control part 350 receives a control signal CONT from an external device (not shown) to provide the sensing driving section 500 with control signals as will be discussed in more detail below. The control signal CONT may include a main clock signal, a vertical synchronization signal, a horizontal synchronization signal and various other similar signals. The timing control part 350 uses the control signal CONT to generate a first control signal CONT1 controlling a driving timing of the first sensing gate driving part 510, a second control signal CONT2 controlling a driving timing of the second sensing gate driving part 520 and a third control signal CONT3 controlling a driving timing of the read out driving part 530. The first control signal CONT1 may include a vertical start signal, a first sensing gate clock signal, an output enable signal, and various other similar signals. The second control signal CONT2 may include a vertical start signal, a second sensing gate clock signal, an output enable signal, and various other similar signals. The third control signal CONT3 may include a horizontal start signal, a clock signal, an inversion signal, and various other similar signals.

The light source part 400 includes a plurality of light sources (not shown). In the present exemplary embodiment, the light sources are disposed below the touch display panel 1100 to provide the touch display panel 1100 with an internally supplied light. The light sources may generate at least one of infrared wavelength light ("IR light") and a visible wavelength light ("Visible light"). The light source part 400 may include a plurality of light blocks LB. In the exemplary embedment illustrated in FIG. 1, the number of the light source blocks LB may be, for example, eight.

The touch image detecting section 600 receives the read out signal R read out from the read out driving part 530. The read out signal R output from the touch display panel 1100 may correspond to an amount of light sensed by sensing elements (described in more detail below with respect to FIGS. 2-4) disposed in the touch display panel 1100. The touch image detecting section 600 detects a touch image using the read out signal R.

Figure 2:
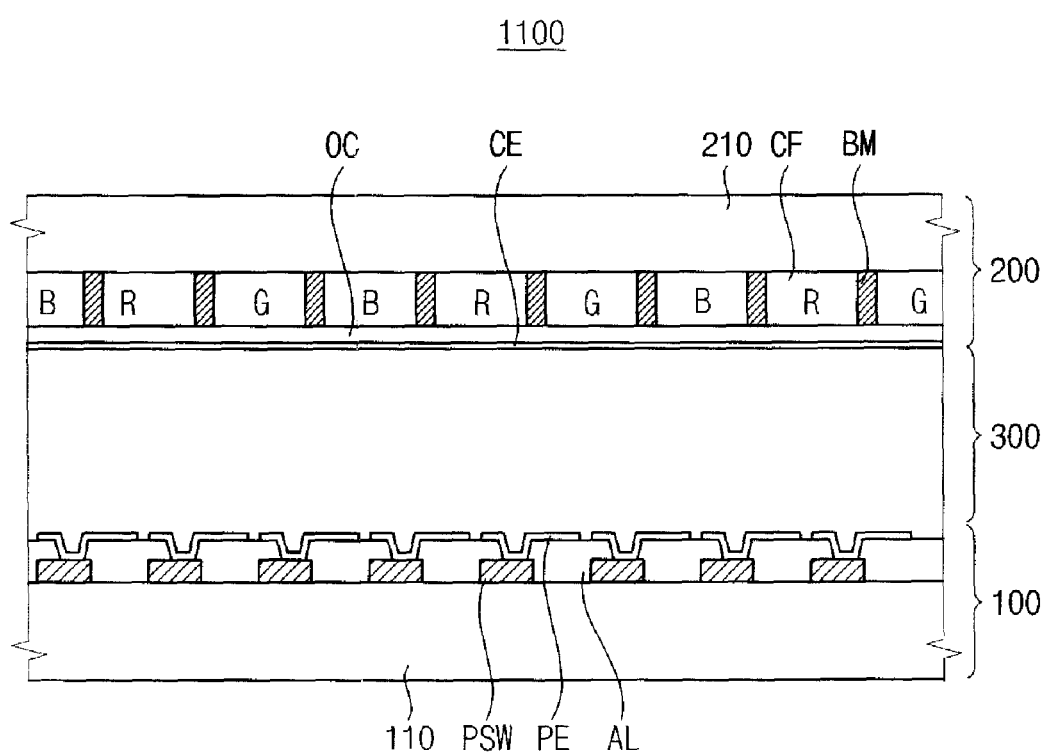
FIG. 2 is a cross-sectional view schematically illustrating an exemplary embodiment of a touch display panel of FIG. 1.

FIG. 2 is a cross-sectional view schematically illustrating the exemplary embodiment of a touch display panel of FIG. 1.

Referring to FIGS. 1 and 2, the present exemplary embodiment of a touch panel 1100 includes a display substrate 100 and a touch substrate 200. The touch display panel 1100 may further include a liquid crystal layer 300 interposed between the display substrate 100 and the touch substrate 200. The display substrate 100 includes a first base substrate 110, a pixel switching element PSW, a pixel electrode PE electrically connected to the pixel switching element PSW and an array layer AL.

The touch substrate 200 includes a sensing layer and a color filter layer. The sensing layer includes a first sensing element (not shown) sensing the IR light and a second sensing element (not shown) sensing the Visible light. The color filter layer is formed on the sensing layer. The color filter layer includes color filters R, G and B, a black matrix BM and an overcoating layer OC and a common electrode CE sequentially disposed on the color filters R, G and B and the black matrix BM. Alternative exemplary embodiments may include alternative configurations wherein one or more of the layers in the color filter layer may instead by disposed on the display substrate 100, e.g., the common electrode CE, the color filters R, G and B, etc.

Figure 3:
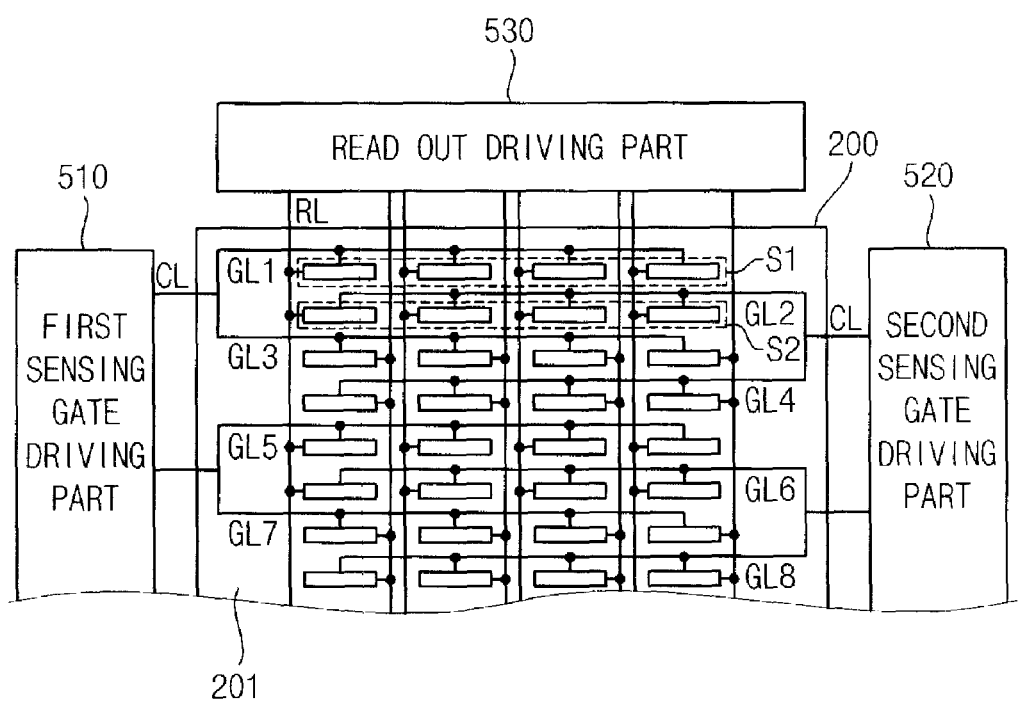
FIG. 3 is a partial block diagram schematically illustrating an exemplary embodiment of a touch substrate of FIG. 2.
Figure 3:
Figure 4:
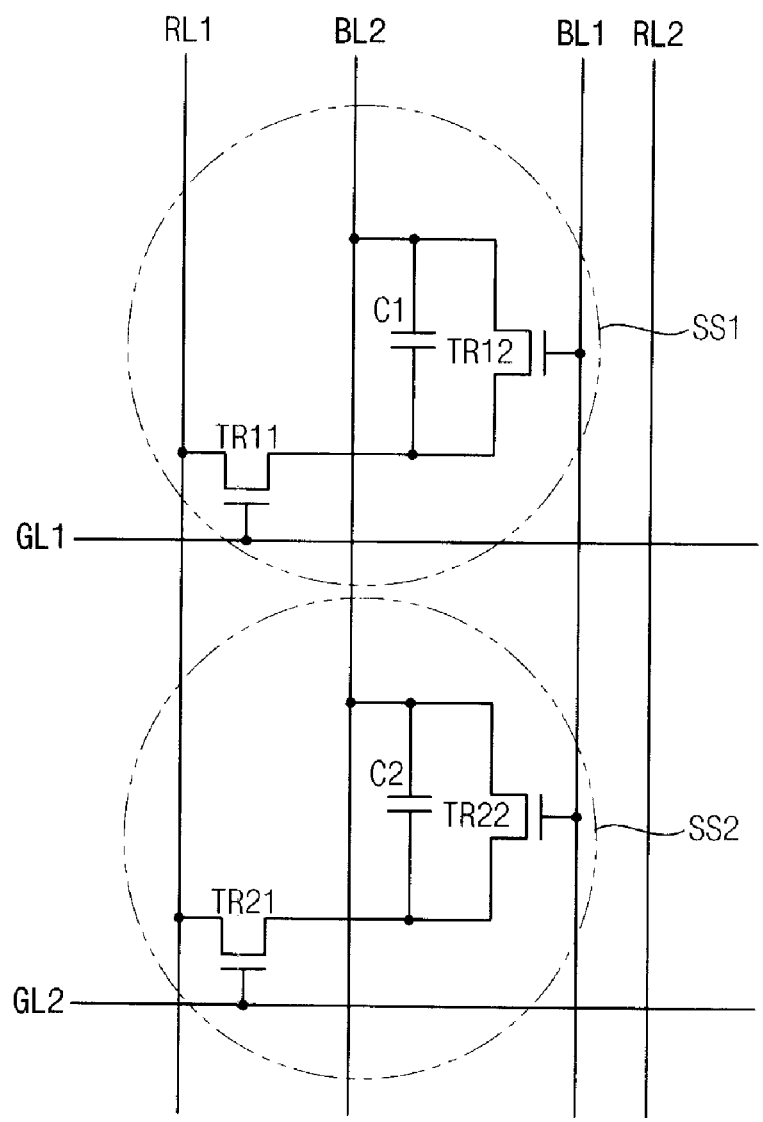
FIG. 4 is an equivalent circuit diagram illustrating exemplary embodiments of a first element and a second element of FIG. 3.

FIG. 3 is a partial block diagram schematically illustrating a touch substrate of FIG. 2. FIG. 4 is an equivalent circuit diagram illustrating exemplary embodiments of a first element and a second element of FIG. 3.

Referring to FIGS. 2 to 4, the touch substrate 200 includes a first sensing section S1, a second sensing section S2, the first sensing gate driving part 510, the second sensing gate driving part 520, the read out driving part 530, a plurality of sensing gate lines GL and a plurality of read out lines RL.

The first sensing section S1 is connected to odd-numbered gate lines, e.g., GL1, GL3, . . . , GL1077 and GL1079, of the sensing gate lines GL. The first sensing section S1 includes the first sensing element part SS1 and the second element part SS2 (illustrated in FIG. 4). The first sensing element part SS1 includes a first switching element TR11, a first sensing element TR12 and a first capacitor C1. The second sensing element part SS2 includes a second switching element TR21, a second sensing element TR22 and a second capacitor C2.

The first switching element TR11 includes a first gate electrode, a first source electrode and a first drain electrode. The first gate electrode of the first switching element TR11 is connected to the first gate line GL1, the first source electrode of the first switching element TR11 is connected to a first read out line RL1, and the first drain electrode of the first switching element TR11 is connected to a second source electrode of the first sensing element TR11 and a first electrode the first capacitor C1.

The first sensing element TR12 includes a second gate electrode, the second source electrode and a second drain electrode. The second gate electrode of the first sensing element TR12 is connected to a first bias line BL1, the second source electrode of the first sensing element TR12 is connected to the first drain electrode of the first switching element TR11 and the first electrode of the first capacitor C1, and the second drain electrode of the first sensing element TR12 is connected to a second electrode of the first capacitor C1 and a second bias line BL2.

The first capacitor C1 includes the first electrode and the second electrode. The first electrode of the first capacitor C1 is connected to the first drain electrode of the first switching element TR11 and the second source electrode of the first sensing element TR12, and the second electrode of the first capacitor C1 is connected to the second bias line BL2 and the drain electrode of the first sensing element TR12. The first capacitor C1 charges, e.g., stores, electric charges in proportion to a light amount collected in an active layer of the first sensing element TR12.

The second switching element TR21 includes a third gate electrode, a third source electrode and a third drain electrode. The third gate electrode of the second switching element TR21 is connected to a second gate line GL2, the third source electrode of the second switching element TR21 is connected to the first read out line RL1, and the third drain electrode of the second switching element TR21 is connected to a fourth source electrode of the second sensing element TR22 and a first electrode of the second capacitor C2.

The second sensing element TR22 includes a fourth gate electrode, a fourth source electrode and a fourth drain electrode. The fourth gate electrode of the second sensing element TR22 is connected to the first bias line BL1, the fourth source electrode of the second sensing element TR22 is connected to the third drain electrode of the second switching element TR21 and the first electrode of the second capacitor C2, and the fourth drain electrode of the second sensing element TR22 is connected to a second electrode of the second capacitor C2 and the second bias line BL2.

The second capacitor C2 includes a first electrode and a second electrode. The first electrode of the second capacitor C2 is connected the third drain electrode of the second switching element TR21 and the fourth source electrode of the second sensing element TR22, the second electrode of the second capacitor C2 is connected to the second bias line BL2 and the drain electrode of the second sensing element TR22. The second capacitor C2 charges, e.g., stores, electric charges in response to the visible light sensed by the second sensing element TR22.

The second sensing section S2 is connected to even-numbered sensing gate lines, e.g., GL2, GL4, . . . , GL1078 and GL1080, of the sensing gate lines GL. The second sensing section S2 includes sensing elements parts similar to the first sensing element part SS1 and the second sensing element part SS2 as described above wherein the first sensing element part SS1 includes the first switching element TR11, the first sensing element TR12 and the first capacitor C1 and the second sensing element part SS2 includes the second switching element TR21, the second sensing element TR22 and the second capacitor C2.

The sensing driving section 500 includes the first sensing gate driving part 510, the second sensing gate driving part 520 and the read out driving part 530. In one exemplary embodiment, the first and second sensing gate driving parts 510 and 520 may be formed on the touch substrate 200 and may be constructed in the form of a chip. Alternative exemplary embodiments include configurations wherein the first and second sensing gate driving parts 510 and 520 may be formed on the touch substrate 200 using an amorphous silicon gate ("ASG") technology while the sensing gate lines GL are formed on the touch substrate 200 at a substantially same time.

The first sensing gate driving part 510 is connected to the odd-numbered sensing gate lines, e.g., GL1, GL3, . . . , GL1077 and GL1079, of the sensing gate lines. The first sensing gate driving part 510 sequentially activates the odd-numbered sensing gate lines, e.g., GL1, GL3, . . . , GL1077 and GL1079, during an odd-numbered frame. For example, the first sensing gate driving part 510 sequentially activates the odd-numbered sensing gate lines, e.g., GL1, GL3, . . . , GL1077 and GL1079, during a first odd-numbered field of the odd-numbered frame. In addition, the first sensing gate driving part 510 sequentially activates the odd-numbered sensing gate lines, e.g., GL1, GL3, . . . , GL1077 and GL1079, during a second field of the odd-numbered frame. In one exemplary embodiment, the first sensing gate driving part 510 activates the odd-numbered sensing gate lines, e.g., GL1, GL3, . . . , GL1077 and GL1079, twice during an odd-numbered frame.

For example, two adjacent odd-numbered sensing gate lines of the odd-numbered sensing gate lines, e.g., GL1 and GL3, GL5 and GL7, are connected to the first sensing gate driving part 510 through a common line CL. The first sensing gate driving part 510 simultaneously activates the two adjacent odd-numbered sensing gate lines. For example, the first sensing gate driving part 510 sequentially activates every two of the odd-numbered sensing gate lines GL1, GL3, . . . , GL1077 and GL1079 in a two by two manner.

The second sensing gate driving part 520 is connected to the even-numbered sensing gate lines, e.g., GL2, GL4, . . . , GL1078 and GL1080, of the sensing gate lines. The second sensing gate driving part 520 sequentially activates the odd-numbered sensing gate lines, e.g., GL2, GL4, . . . , GL1078 and GL1080. The second sensing gate driving part 520 sequentially activates the even-numbered sensing gate lines, e.g., GL2, GL4, . . . , GL1078 and GL1080, during the even-numbered frames. For example, the second sensing gate driving part 520 sequentially activates the even-numbered sensing gate lines, e.g., GL2, GL4, . . . , GL1078 and GL1080, during a first even-numbered field of the even-numbered frame. In addition, the second sensing gate driving part 520 sequentially activates the even-numbered sensing gate lines, e.g., GL2, GL4, . . . , GL1078 and GL1080, during a second even-numbered field of the even-numbered frame. The second sensing gate driving part 520 activates the even-numbered sensing gate lines, e.g., GL2, GL4, . . . , GL1078 and GL1080, twice during an even-numbered frame.

For example, adjacent two adjacent even-numbered sensing gate lines of the even-numbered sensing gate lines, e.g., GL2 and GL4, GL6 and GL8 etc., are connected to the second sensing gate driving part 520 by the common line CL. The second sensing gate driving part 520 simultaneously activates the adjacent two even-numbered sensing gate lines. For example, the second sensing gate driving part 520 sequentially activates the even-numbered sensing gate lines GL2, GL4, . . . , GL1078 and GL1080 in a two by two pattern.

As described above, the touch display panel 1100 according to the exemplary embodiment is driven in the interlaced driving method in which the odd-numbered sensing gate lines, e.g., GL1, GL3, . . . , GL1077 and GL1079, are sequentially activated by the first sensing gate driving part 510 during the first frame and then the even-numbered sensing gate lines, e.g., GL2, GL4, . . . , GL1078 and GL1080, are sequentially activated by the second sensing gate driving part 520 in a two by two manner.

The read out driving part 530 is connected to the read out lines RL. The read out driving part 530 reads out the light amount sensed by each of the first and second sensing elements TR12 and TR22 of the first and second sensing element parts SS1 and SS2 of the first and second sensing sections S1 and S2. The read out driving part 530 reads out a first light amount sensed by the first sensing section S1 during the odd-numbered frame. For example, in one exemplary embodiment the read out driving part 530 reads out a first accumulated light amount sensed by the first sensing section S1 during the first odd-numbered field of the odd-numbered frame and a second accumulated light amount sensed by the first sensing section S1 during the second odd-numbered field of the odd-numbered frame. The read out driving part 530 reads out a second light amount sensed by the second sensing section S2 during the even-numbered frame. For example, in one exemplary embodiment the read out driving part 530 reads out a third accumulated light amount sensed by the second sensing section S2 during the first even-numbered field of the even-numbered frame and a fourth accumulated light amount sensed by the second sensing section S2 during the second even-numbered field of the even-numbered frame. That is, the first light amount sensed by the first sensing section S1 may include a first accumulated light amount and a second accumulated light amount, while the second sensing section S2 may include a third accumulated light amount and a fourth accumulated light amount.

Figure 5:
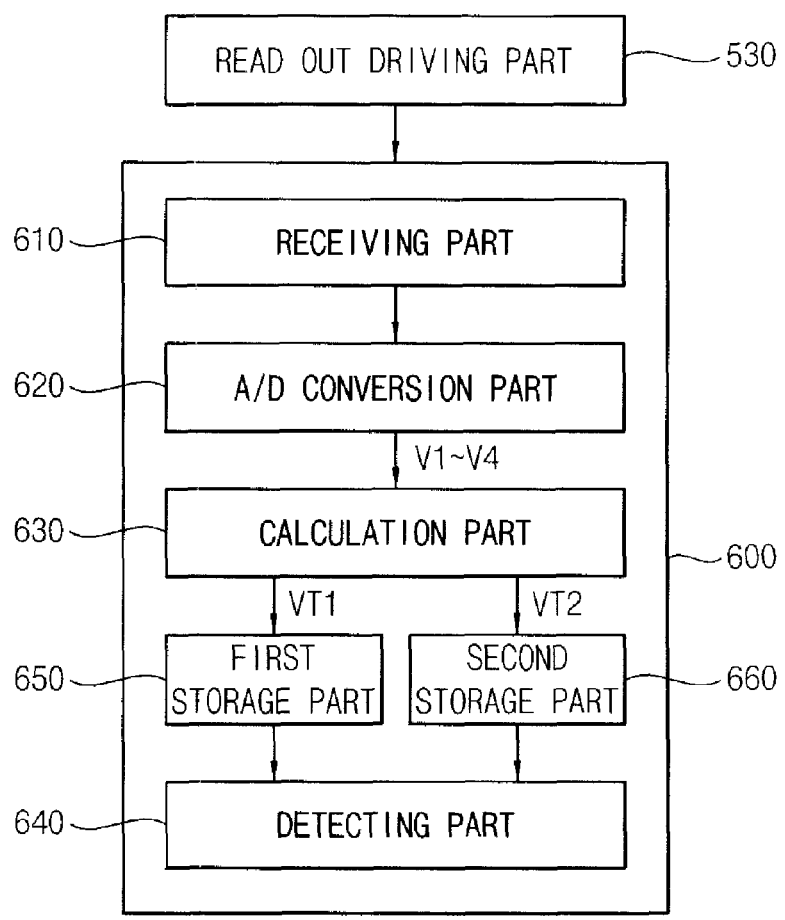
FIG. 5 is a block diagram illustrating an exemplary embodiment of a touch image detecting section of FIG. 1.

FIG. 5 is a block diagram illustrating an exemplary embodiment of a touch image detecting section 600 of FIG. 1.

Referring to FIGS. 1, 3 and 5, the touch image detecting section 600 includes a receiving part 610, an analog-to-digital ("A/D") conversion part 620, a calculation part 630 and a detecting part 640. Exemplary embodiments also include configurations wherein the touch image detecting section 600 may further include a first storage part 650 and a second storage part 660.

The receiving part 610 receives the first light amount read out from the first sensing section S1 during the odd-numbered frame from the read out driving part 530. The first light amount read out from the first sensing section S1 during the odd-numbered frame includes the first accumulated light amount read out from the first sensing section S1 during the first odd-numbered field of the odd-numbered frame and the second accumulated light amount read out from the first sensing section S1 during the second odd-numbered field of the odd-numbered frame as discussed above.

The first accumulated light amount is a first charge amount accumulated in the first capacitor C1 before the first odd-numbered field of the present odd-numbered frame. The first accumulated light amount may be a light amount accumulated before the odd-numbered sensing gate lines, e.g., GL1, GL3, . . . , GL1077 and GL1079, are turned on. The first accumulated light amount may include the internal light and the external light accumulated during the previous even-numbered frame and the second field of the previous odd-numbered frame. The second accumulated light amount is a second charge amount accumulated in the first capacitor C1 before the second odd-numbered field of the present odd-numbered frame. The second accumulated light amount may be a light amount accumulated before the odd-numbered sensing gate lines, e.g., GL1, GL3, . . . , GL1077 and GL1079, are turned on. The second accumulated light amount may include the internal light and the external light accumulated during the first odd-numbered field of the present odd-numbered frame.

The receiving part 610 receives the second light amount read out from the second sensing section S2 during the even-numbered frame from the read out driving part 530. The second light amount read out from the second sensing section S2 during the even-numbered frame includes the third accumulated light amount read out from the second sensing section S2 during the first even-numbered field of the even-numbered frame and the fourth accumulated light amount read out from the second sensing section S2 during the second even-numbered field of the even-numbered frame as discussed above.

The third accumulated light amount is a third charge amount accumulated in the second capacitor C2 before the first even-numbered field of the present even-numbered frame. The third accumulated light amount may be a light amount accumulated before the even-numbered sensing gate lines, e.g., GL2, GL4, . . . , GL1078 and GL1080, are turned on. The third accumulated light amount may include the internal light and the external light accumulated during the first even-numbered field of the previous even-numbered frame and the present odd-numbered frame. The fourth accumulated light amount is a fourth charge amount accumulated in the second capacitor C2 before the second even-numbered field of the present even-numbered frame. The fourth accumulated light amount may be a light amount accumulated before the even-numbered sensing gate lines, e.g., GL2, GL4, . . . , GL1078 and GL1080, are turned on. The fourth accumulated light amount may include the internal light and the external light accumulated during the first even-numbered field of the present even-numbered frame.

The A/D conversion part 620 converts the first to fourth accumulated light amounts which have an analog value into a digital first accumulated light amount value V1, a digital second accumulated light amount value V2, a digital third accumulated light amount value V3 and a digital fourth accumulated light amount value V4.

The calculation part 630 calculates a first touch information VT1 according to the internal light of the first light amount sensed by the first sensing section S1, using the first and second accumulated light amounts V1 and V2 of the odd-numbered frame. The calculation part 630 calculates a second touch information VT2 according to the internal light of the second light amount sensed by the second sensing section S2, using the third and fourth accumulated light amounts V3 and V4 of the even-numbered frame.

In the exemplary embodiment wherein they are included, the first storage part 650 and the second storage part 660 may store the first touch information VT1 and the second touch information VT2 calculated by the calculation part 630, respectively.

The detecting part 640 combines the first and second touch information VT1 and VT2 to detect a touch image. The external light may be removed from the first and second touch information VT1 and VT2, and the internal light may be remained in the first and second touch information VT1 and VT2 as discussed above and described in more detail below.

FIG. 6A is a timing diagram explaining an exemplary embodiment of a method in which the display apparatus 1000 of FIG. 1 detects a first touch information during an odd-numbered frame.

In this exemplary embodiment, it is assumed that the number of the sensing gate lines GL is 1080, although alternative exemplary embodiments may include a different number of gate lines GL.

Referring to FIGS. 1, 3 and 6A, a method of detecting a first touch information which is a portion of the touch image during the odd-numbered frame ODD will be explained. In the present exemplary embodiment, an interval of the odd-numbered frame ODD is about 16.7 ms. For convenience of explanation, the odd-numbered frame ODD may include a first odd-numbered frame ODD1 and a second odd-numbered frame ODD2. Each of the first and second odd-numbered frames ODD1 and ODD2 may include a first odd-numbered field A and a second odd-numbered field B. Thus, the first odd-numbered frame ODD1 includes a first odd-numbered field A1 and a second odd-numbered field B1 and the second odd-numbered frame ODD2 includes a first odd-numbered field A2 and a second odd-numbered field B2. As used herein, the term field may be synonymous with the term "sub-frame". The first odd-numbered field A is a period in which the odd-numbered sensing gate lines GL1, GL3, . . . , GL1077 and GL1079 are firstly activated, and the second odd-numbered field B is a period in which the odd-numbered sensing gate lines GL1, GL3, . . . , GL1077 and GL1079 are secondly activated.

Hereinafter, an operation of the first odd-numbered field A will be explained.

When the first and third sensing gate lines GL1 and GL3 of the odd-numbered sensing gate lines GL1, GL3, . . . , GL1077 and GL1079 are turned on, a first light source block LB1 corresponding to the first and third sensing gate lines GL1 and GL3 is turned on. The first light source block LB1 maintains a turned-on state from a first time when the first and third sensing gate lines GL1 and GL3 are turned on to a second time when the first and third sensing gate lines GL1 and GL3 are again turned on in the second odd-numbered field B of the present odd-numbered frame ODD.

For example, an interval when the first and third sensing gate lines GL1 and GL3 are turned on is about 30 μs, and an interval when the first light source LB1 is turned on is about 8.3 ms. Hereinafter, since the intervals when the sensing gate lines GL and the light sources are turned on are substantially the same as the above-mentioned interval when the sensing gate lines GL and the first light source LB1 are turned on, any further explanation concerning the interval will be omitted.

Then, two of the fifth to hundred-thirty-fifth sensing gate lines GL5 to GL135 of the odd-numbered sensing gate lines GL1, GL3, . . . , GL1077 and GL1079 are sequentially turned on.

When the hundred-thirty-seventh and hundred-thirty-ninth sensing gate lines GL137 and GL139 of the odd-numbered sensing gate lines GL1, GL3, . . . , GL1077 and GL1079 are turned on, a second light source block LB2 corresponding to the hundred-thirty-seventh and hundred-thirty-ninth sensing gate lines GL137 and GL139 is then turned on. The second light source block LB2 maintains the turn-on state from a first time when the hundred-thirty-seventh and hundred-thirty-ninth sensing gate lines GL137 and GL139 are turned on to a second time when the hundred-thirty-seventh and hundred-thirty-ninth sensing gate lines GL137 and GL139 are again turned on in the second odd-numbered field B of the present odd-numbered frame ODD.

Here, the turning on of the second light source block LB2 corresponding to the activation of the hundred-thirty-seventh and hundred-thirty-ninth sensing gate lines GL137 and GL139 is a function of dividing the total number of even numbered gate lines GL1, GL3, . . . , GL1077 and GL1079 by the number of light blocks, e.g., LB1-LBB. In an exemplary embodiment where there were more than eight light blocks LB, the second light block LB2 may be turned on to correspond to earlier gate lines, e.g., GL115 and GL117. In an exemplary embodiment where there were fewer than eight light blocks LB, the second light block LB2 may be turned on to correspond to later gate lines, e.g., GL165 and GL167.

Two of the hundred-forty-first to the three-hundred-sixty-ninth sensing gate lines GL141 to GL369 of the odd-numbered sensing gate lines GL1, GL3, . . . , GL1077 and GL1079 are sequentially turned on.

Remaining odd-numbered sensing gate lines GL371, GL373, . . . , GL1077 and GL1079 corresponding to the third light source block LB3 to the eighth light source block LB8 are sequentially activated. Since the method of driving the remaining odd-numbered sensing gate lines GL371, GL373, . . . , GL1077 and GL1079 is substantially the same as above-mentioned method of driving the first to the three-hundred-sixty-ninth odd-numbered sensing gate lines GL1, GL3, . . . , GL367 and GL369, any further explanation concerning the above remaining odd-numbered sensing gate lines GL371, GL373, . . . , GL1077 and GL1079 will be omitted.

Thus, the first accumulated light amount sensed by the first sensing section S1 connected to the odd-numbered sensing gate lines GL1, GL3, . . . , GL1077 and GL1079 may be read on in the first odd-numbered field A of the odd-numbered frame ODD.

An operation of the second odd-numbered field B will be explained in detail below.

When the first and third sensing gate lines GL1 and GL3 are turned on again, a first light source block LB1 corresponding to the first and third sensing gate lines GL1 and GL3 is turned off. The first light source block LB1 maintains a turn-on state from a first time when the first and third sensing gate lines GL1 and GL3 are turned on a second time when the first and third sensing gate lines GL1 and GL3 are turned on again in the next odd-numbered frame ODD.

Two of the fifth to the hundred-thirty-fifth sensing gate lines GL5 to GL135 of the odd-numbered sensing gate lines GL1, GL3, . . . , GL1077 and GL1079 are sequentially turned on.

When the hundred-thirty-seventh and hundred-thirty-ninth sensing gate lines GL137 and GL139 are turned on again, a second light source block LB2 corresponding to the hundred-thirty-seventh and hundred-thirty-ninth sensing gate lines GL137 and GL139 is turned off. The second light source block LB2 maintains the turned-on state from the first time when the hundred-thirty-seventh and hundred-thirty-ninth sensing gate lines GL137 and GL139 are turned on a second time when the hundred-thirty-seventh and hundred-thirty-ninth sensing gate lines GL137 and GL139 are turned on again in the next odd-numbered frame ODD.

Two of the hundred-forty-first to the three-hundred-sixty-ninth sensing gate lines GL141 to GL369 of the odd-numbered sensing gate lines GL1, GL3, . . . , GL1077 and GL1079 are sequentially turned on.

Remaining odd-numbered sensing gate lines GL371, GL373, . . . , GL1077 and GL1079 corresponding to the third light source block LB3 to the eighth light source block LB8 are sequentially activated. Since the method of driving the remaining odd-numbered sensing gate lines GL371, GL373, . . . GL1077 and GL1079 is substantially the same as the above-mentioned method of driving the first to the three-hundred-sixty-ninth odd-numbered sensing gate lines GL1, GL3, . . . , GL367 and GL369, any further explanation concerning the above remaining odd-numbered sensing gate lines GL371, GL373, . . . , GL1077 and GL1079 will be omitted.

Thus, the second accumulated light amount sensed by the first sensing section S1 connected to the odd-numbered sensing gate lines GL1, GL3, . . . , GL1077 and GL1079 may be read out in the second odd-numbered field B of the odd-numbered frame ODD. As described above, the light blocks LB1-LB8 are sequentially turned on as the gate lines in corresponding sensing sections are turned on during a first field A of an odd-numbered frame ODD. Then, the light blocks LB1-LB8 are sequentially turned off as the gate lines in corresponding sensing sections are turned on during a second field B of an odd-numbered frame ODD.

Figure 6B:
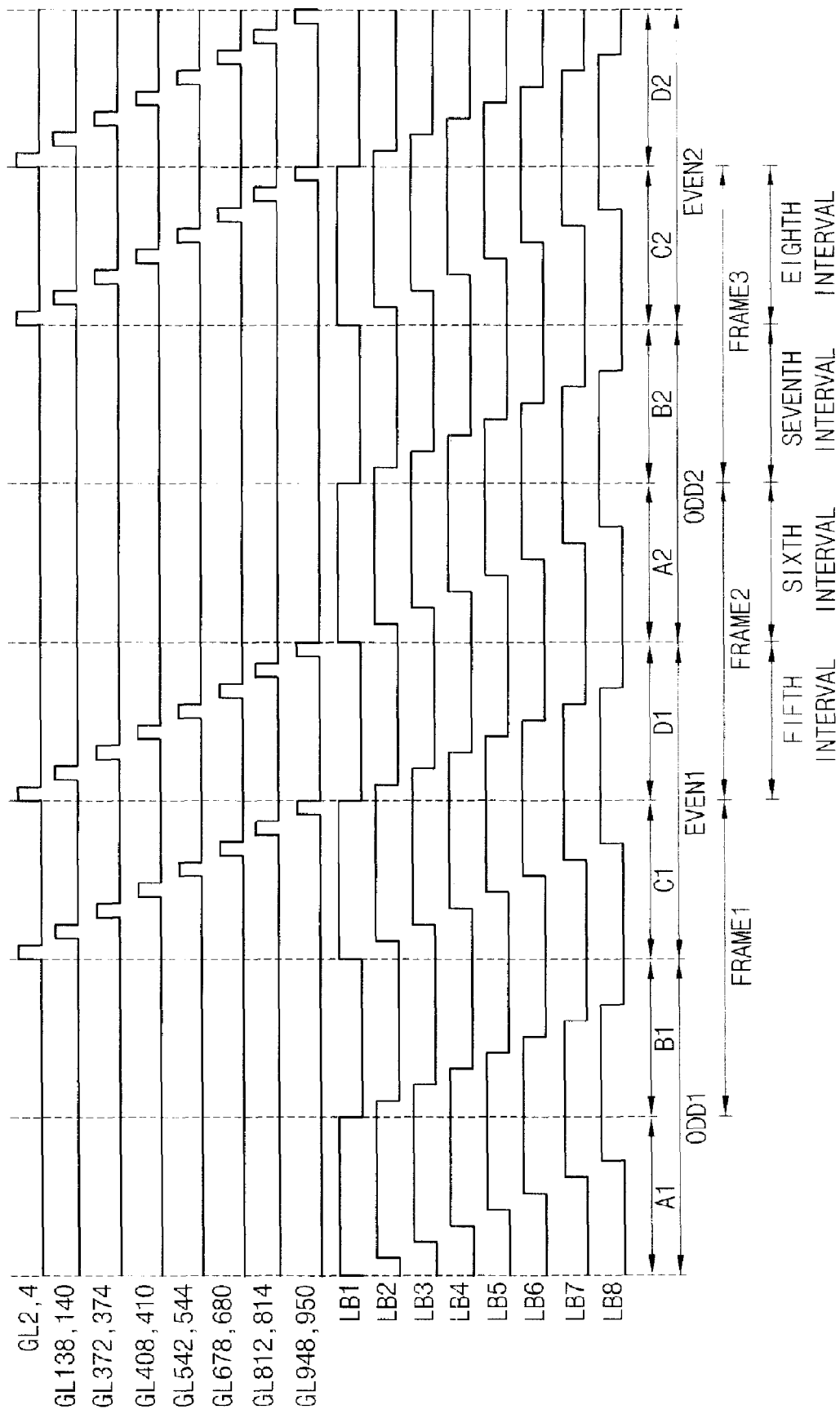
FIG. 6B is a timing diagram illustrating a method in which the exemplary embodiment of a display apparatus of FIG. 1 detects a second touch information during an even-numbered frame.

FIG. 6B is a timing diagram explaining a method in which the exemplary embodiment of a display apparatus 1000 of FIG. 1 detects a second touch information during an even-numbered frame.

Referring to FIGS. 3 and 6B, a method of detecting a second touch information which is a portion of the touch image during the even-numbered frame EVEN will be explained. An interval of the even-numbered frame EVEN is about 16.7 ms. For convenience of explanation, the even-numbered frame EVEN may include a first even-numbered frame EVEN1 and a second even-numbered frame EVEN2. Each of the first and second even-numbered frames EVEN1 and EVEN2 may include a first even-numbered field C and a second even-numbered field D. Thus, the first even-numbered frame EVEN1 includes a first even-numbered field C1 and a second even-numbered field D1 and the second even-numbered frame EVEN2 includes a first even-numbered field C2 and a second even-numbered field D2. The first even-numbered field C is a period in which the even-numbered sensing gate lines GL1, GL3, . . . , GL1077 and GL1079 are firstly activated, and the second even-numbered field D is a period in which the odd-numbered sensing gate lines GL1, GL3, . . . , GL1077 and GL1079 are secondly activated.

First, an operation of the first even-numbered field C will be explained in more detail.

When the second and fourth sensing gate lines GL2 and GL4 of the even-numbered sensing gate lines GL2, GL4, . . . , GL1078 and GL1080 are turned on, the first light source block LB1 corresponding to the second and fourth sensing gate lines GL2 and GL4 is turned on. The first light source block LB1 maintains a turned-on state from a first time when the second and fourth sensing gate lines GL2 and GL4 are turned on to a second time when the second and fourth sensing gate lines GL2 and GL4 are turned on again in the second even-numbered field D of the present even-numbered frame EVEN, e.g., D1 in EVEN1.

Two of the sixth to the hundred-thirty-sixth sensing gate lines GL6 to GL136 of the even-numbered sensing gate lines GL2, GL4, ..., GL1078 and GL1080 are sequentially turned on.

When the hundred-thirty-eighth and hundred-fortieth sensing gate lines GL138 and GL140 of the even-numbered sensing gate lines GL2, GL4, ..., GL1078 and GL1080 are turned on, the second light source block LB2 corresponding to the hundred-thirty-eighth and hundred-fortieth sensing gate lines GL138 and GL140 is turned on. The second light source block LB2 maintains a turned-on state from a first time when the hundred-thirty-eighth and hundred-fortieth sensing gate lines GL138 and GL140 are turned on to a second time when the hundred-thirty-eighth and hundred-fortieth sensing gate lines GL138 and GL140 are turned on again in the second even-numbered field D of the present even-numbered frame EVEN, e.g., D1 in EVEN1.

Two of the hundred-forty-second to the three-hundred-seventieth sensing gate lines GL142 to GL370 of the even-numbered sensing gate lines GL2, GL4, ..., GL1078 and GL1080 are sequentially turned on.

Remaining even-numbered sensing gate lines GL372, GL374, ..., GL1078 and GL1080 corresponding to the third light source block LB3 to the eighth light source block LB8 are sequentially activated. Since the method of driving the remaining even-numbered sensing gate lines GL372, GL374, ... GL1078 and GL1080 is substantially the same as above-mentioned method of driving the second to the three-hundred-seventieth even-numbered sensing gate lines GL2, GL4, ... GL368 and GL370, any further explanation concerning the above remaining even-numbered sensing gate lines GL372, GL374, ... GL1078 and GL1080 will be omitted.

Thus, the third accumulated light amount sensed by the second sensing section S2 connected to the even-numbered sensing gate lines GL2, GL4, ..., GL1078 and GL1080 may be read on in the first even-numbered field C of the even-numbered frame EVEN, e.g., C1 of EVEN1.

Hereinafter, an operation of the second even-numbered field D will be explained in more detail.

When the second and fourth sensing gate lines GL2 and GL4 are turned on again, the first light source block LB1 corresponding to the second and fourth sensing gate lines GL2 and GL4 is turned off The first light source block LB1 maintains a turned-off state from a first time when the second and fourth sensing gate lines GL2 and GL4 are turned on to a second time when the second and fourth sensing gate lines GL2 and GL4 are turned on again in the next even-numbered frame EVEN, e.g., C2 in EVEN2.

Two of the sixth to the hundred-thirty-sixth sensing gate lines GL6 to GL136 of the even-numbered sensing gate lines GL2, GL4, ..., GL1078 and GL1080 are sequentially turned on.

When the hundred-thirty-eighth and hundred-fortieth sensing gate lines GL138 and GL140 are turned on again, the second light source block LB2 corresponding to the hundred-thirty-eighth and hundred-fortieth sensing gate lines GL138 and GL140 is turned off The second light source block LB2 maintains a turned-off state from a first time when the hundred-thirty-eighth and hundred-fortieth sensing gate lines GL138 and GL140 are turned on to a second time when the hundred-thirty-eighth and hundred-fortieth sensing gate lines GL138 and GL140 are turned on again in the next even-numbered frame EVEN, e.g., C2 in EVEN2.

Two of the hundred-forty-second to the three-hundred-seventieth sensing gate lines GL142 to GL370 of the even-numbered sensing gate lines GL2, GL4, ..., GL1078 and GL1080 are sequentially turned on.

Remaining even-numbered sensing gate lines GL372, GL374, ..., GL1078 and GL1080 corresponding to the third light source block LB3 to the eighth light source block LB8 are sequentially activated. Since the method of driving the remaining even-numbered sensing gate lines GL372, GL374, ... GL1078 and GL1080 is substantially the same as above-mentioned method of driving the second to the three-hundred-seventieth even-numbered sensing gate lines GL2, GL4, ... GL368 and GL370, any further explanation concerning the above remaining even-numbered sensing gate lines GL372, GL374, ... GL1078 and GL1080 will be omitted.

Thus, the fourth accumulated light amount sensed by the second sensing section S2 connected to the even-numbered sensing gate lines GL2, GL4, ..., GL1078 and GL1080 may be read out in the second even-numbered field D of the even-numbered frame EVEN, e.g., D1 of EVEN1. As described above, the light blocks LB1-LB8 are sequentially turned on as the gate lines in corresponding sensing sections are turned on during a first field C of an even-numbered frame EVEN. Then, the light blocks LB1-LB8 are sequentially turned off as the gate lines in corresponding sensing sections are turned on during a second field D of an even-numbered frame EVEN.

Here, one frame may be an interval including an odd-numbered field and an even-numbered field continuous to the odd-numbered field. For example, in one exemplary embodiment the frame may be the interval including a second odd-numbered field B and a first even-numbered field C or the interval including a second even-numbered field D and a first odd-numbered field A.

FIGS. 7A, 7B, 7C and 7D are conceptual views illustrating medium images of the first touch information according to FIG. 6A.

For the convenience of the explanation, an example in which the total number of the sensing gate lines GL is 30 is explained, although, as described above, the total number of sensing gate lines GL may be much larger. Hereinafter, a method of calculating the first touch information according to a driving of the odd-numbered gate lines GL1 to GL29 of the sensing gate lines GL will be explained.

For example, each of images of FIGS. 7A to 7D is divided into odd areas ODD_A corresponding to the odd-numbered sensing gate lines GL1 to GL29 and even areas EVEN_A corresponding to the even-numbered sensing gate lines GL2 to GL30. Since the images of FIGS. 7A to 7D are acquired by driving the odd-numbered sensing gate lines GL1 to GL29, the even areas EVEN_A are displayed in a black color. Images corresponding to the even-numbered gate lines GL2 to GL30 will be described in more detail below with respect to FIGS. 8A-8D.

Figure 7A:
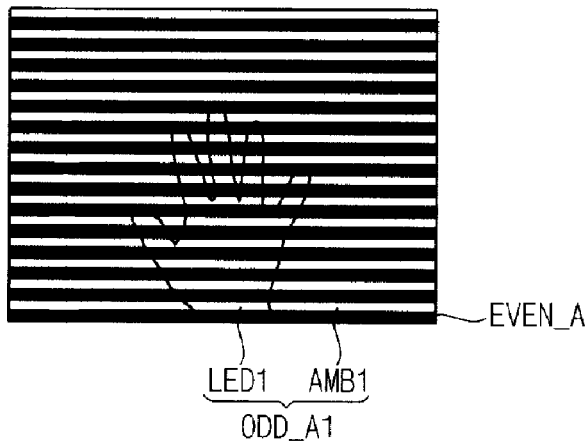
FIGS. 7A, 7B, 7C and 7D are conceptual views illustrating medium images of the first touch information according to FIG. 6A.

Referring to FIGS. 6A and 7A, the odd-numbered sensing gate lines GL1 to GL29 are activated in the first odd-numbered field A2 of the second odd-numbered frame ODD2, so that a first intermediate image IMI1 is acquired from the first sensing section S1 connected to the odd-numbered sensing gate lines GL1 to GL29. The first intermediate image IMI1 is generated according to a first accumulated light amount accumulated during from the second odd-numbered field B1 of the first odd-numbered frame ODD1 to the second even-numbered field D1 of the first even-numbered frame EVEN1 after the first sensing element TR12 or the second sensing element TR22 of the first sensing section S1 is turned on.

An internal light or an external light is sensed during three periods, namely the second odd-numbered field B1 of the first odd-numbered frame ODD1, a first even-numbered field C1 of the first even-numbered frame EVEN1 and a second even-numbered field D1 of the first even-numbered frame EVEN1 to generate the first intermediate image IMI1. For example, for the convenience of the explanation, in one exemplary embodiment the second odd-numbered field B1 of the first odd-numbered frame ODD1 is defined as a first interval, a first even-numbered field C1 of the first even-numbered frame EVEN1 is defined as a second interval, and a second even-numbered field D1 of the first even-numbered frame EVEN1 is defined as a third interval.

Since the light source blocks LB are turned off during the first interval corresponding to field B1, only a light amount corresponding to the external light sensed during the first interval corresponding to field B1 may be accumulated in the first capacitor C1 of the first sensing section S1.

Since the light source blocks LB are turned on during the second interval, a light amount corresponding to an internal light and the external light sensed during the second interval may be accumulated in the first capacitor C1 of the first sensing section S1.

Since the light source blocks LB are turned off during the third interval, only a light amount corresponding to the external light sensed during the third interval may be accumulated in the first capacitor C1 of the first sensing section S1.

Thus, a first accumulated light amount accumulated in the first capacitor C1 during the first to third intervals may be defined as (3×the external light)+(1×the internal light). The first odd area ODD_A1 of the first intermediate image IMI1 is divided into a first touch area LED1 and a first non-touch area AMB1. The first touch area LED1 may have a light accumulation of (1×the internal light) and the first non-touch area AMB1 may have a light accumulation of (3×the external light).

Figure 7B:
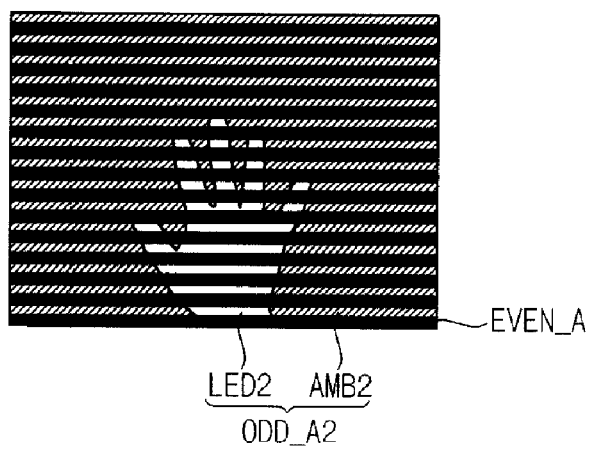

Referring to FIGS. 6A and 7B, the odd-numbered sensing gate lines GL1 to GL 29 are secondly activated in the second odd-numbered field B2 of the second odd-numbered frame ODD2, so that a second intermediate image IMI2 is acquired from the first sensing section S1 connected to the odd-numbered sensing gate lines GL1 to GL29. The second intermediate image IMI2 is generated according to a second accumulated light amount accumulated during the first odd-numbered field A2 of the odd-numbered frame ODD2 of the second frame FRAME2 after the first sensing element TR12 or the second sensing element TR22 of the first sensing section S1 is turned on.

An internal light or an external light is sensed during the first odd-numbered field A2 of the second odd-numbered frame ODD2 to generate the second intermediate image IMI2. For example, for the convenience of explanation, in the present exemplary embodiment the first odd-numbered field A2 of the second odd-numbered frame ODD2 is defined as a fourth interval.

Since the light source blocks LB are turned on during the fourth interval, the light amount corresponding to the internal light and the external light during the fourth interval may be accumulated in the first capacitor C1 of the first sensing section S1.

Thus, a second accumulated light amount accumulated in the first capacitor during the fourth interval may be defined as (1×the external light)+(1×the internal light). The second odd area ODD_A2 of the second intermediate image IMI2 is divided into a second touch area LED2 and a second non-touch area AMB2. The second touch area LED2 may have a light accumulation of (1×the internal light) and the second non-touch area AMB2 may have a light accumulation of (1×the external light).

Figure 7C:
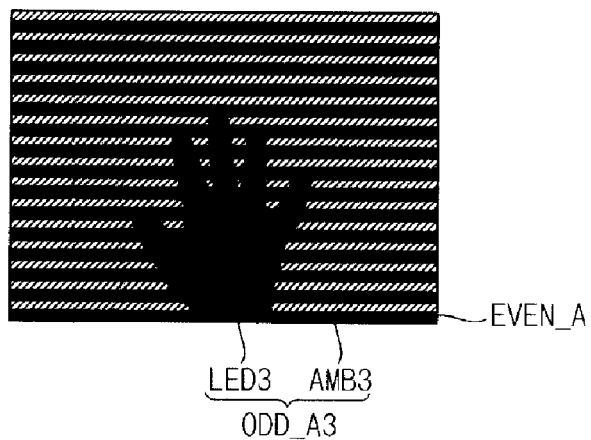

Referring to FIGS. 6A and 7C, a first intermediate value IMV1 may be calculated by subtracting the second accumulated light amount from the first accumulated light amount. The first intermediate value IMV1 may be defined as a light amount of (2×the external light). A second intermediate value IMV2 may be calculated by dividing the first intermediate value IMV1 in half. The second intermediate value IMV2 may be defined as a light amount of (1×the external light). A third odd area ODD_A3 of a third intermediate image IMI3 generated according to the second intermediate value IMV2 is divided into a third touch area LED3 and a third non-touch area AMB3. The third touch area LED3 has (0×the internal light)+(0×the external light), and the third non-touch area AMB3 has (1×the external light).

Figure 7D:
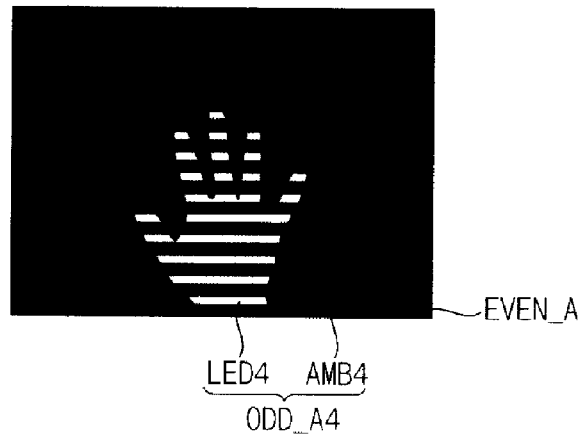

Referring to FIGS. 6A and 7D, a third intermediate value IMV3 may be calculated by subtracting the third image IMI3 from the second accumulated light amount corresponding to the second intermediate image IM12. The third intermediate value IMV3 may be defined as a light amount of (1×the internal light). Thus, the third intermediate value IMV3 is generated in response to the light that includes only the internal light and excludes the external light. A fourth odd area ODD_A4 of a first final image FI1 according to the third intermediate value IMV3 is divided into a fourth touch area LED4 and a fourth non-touch area AMB4. The fourth touch area LED4 has a light accumulation of (1×the internal light), and the fourth non-touch area AMB4 has a light accumulation of (1×the internal light)+a light accumulation of (0×the external light); only there was no internal light accumulation in the fourth non-touch area AMB4, so the area appears blank.

Thus, the first touch information having the external light removed may be acquired using the first accumulated light amount and the second accumulated light amount during the odd-numbered frame ODD.

FIGS. 8A, 8B, 8C and 8D are conceptual views illustrating medium images of the second touch information according to FIG. 6B. The conceptual views are similar to those discussed above with respect to FIGS. 6A and 7A-D.

Hereinafter, an exemplary embodiment of a method in which a second touch information according to the even-numbered gate lines GL2 to GL30 of the sensing gate lines GL is calculated will be explained. The method of calculating the second touch information is substantially the same as the method of calculating the first touch information described in detail above.

For example, each of images of FIGS. 8A to 8D is divided into the odd area ODD_A corresponding to the odd-numbered sensing gate lines GL1 to GL29 and the even area EVEN_A corresponding to the even-numbered sensing gate lines GL2 to GL30. Since the images of FIGS. 8A to 8D are acquired by driving the even-numbered sensing gate lines GL2 to GL30, the odd areas ODD_A are displayed in a black color.

Figure 8A:
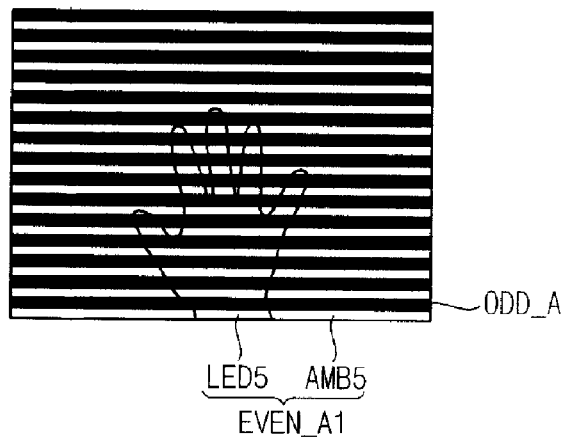
FIGS. 8A, 8B, 8C and 8D are conceptual views illustrating medium images of the second touch information according to FIG. 6B.

Referring to FIGS. 6A and 8A, the even-numbered sensing gate lines GL2 to GL 30 are firstly activated in the first even-numbered field C2 of the second even-numbered frame EVEN2, so that a fourth intermediate image IMI4 is acquired from the second sensing section S2 connected to the even-numbered sensing gate lines GL2 to GL30. The fourth intermediate image IMI4 is generated according to a third accumulated light amount accumulated during a period from the second even-numbered field D1 of the even-numbered frame EVEN1 to the second odd-numbered field B2 of the second odd-numbered frame ODD2 after the first sensing element TR12 or the second sensing element TR22 of the second sensing section S2 is turned on.

An internal light or an external light is sensed during three periods, the three periods including the second even-numbered field D1 of the first even-numbered frame EVEN1, a first odd-numbered field A2 of the second odd-numbered frame ODD2 and a second odd-numbered field B2 of the second odd-numbered frame ODD2 to generate the fourth intermediate image IMI4. For example, for the convenience of the explanation, in the present exemplary embodiment the second even-numbered field D1 of the first even-numbered frame EVEN1 is defined as a fifth interval, a first odd field A2 of the second odd-numbered frame ODD2 is defined as a sixth interval, and a second odd-numbered field B2 of the second odd-numbered frame ODD2 is defined as a seventh interval.

Since the light source blocks LB are turned off during the fifth interval, only an amount of external light during the fifth interval may be accumulated in the first capacitor C1 of the second sensing section S2.

Since the light source blocks LB are turned on during the sixth interval, the light amount corresponding to internal light and external light sensed during the sixth interval may be accumulated in the first capacitor C1 of the second sensing section S2.

Since the light blocks LB are turned off during the seventh interval, the only a light amount corresponding to external light sensed during the seventh interval may be accumulated in the first capacitor C1 of the second sensing section.

Thus, a third accumulated light amount accumulated in the first capacitor C1 during the fifth to the seventh intervals may be defined as a light accumulation of (3×the external light)+a light accumulation of (1×the internal light). The first even area EVEN_A1 of the fourth intermediate image IMI4 is divided into a fifth touch area LED5 and a fifth non-touch area AMB5. The fifth touch area LED5 may have a light accumulation of (1×the internal light) and the fifth non-touch area AMB5 may have a light accumulation of (3×the external light).

Figure 8B:
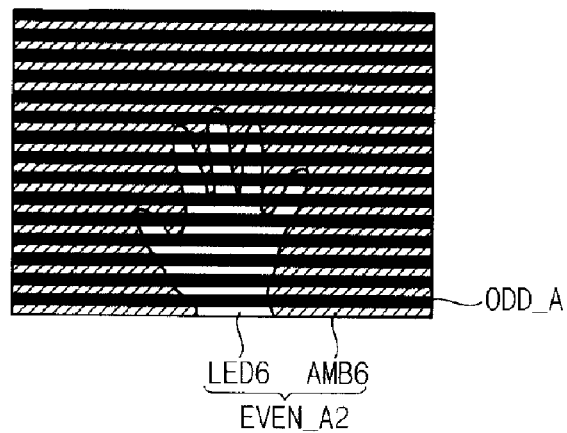

Referring to FIGS. 6A and 8B, the even-numbered sensing gate lines GL2 to GL 30 are secondly activated in the second even-numbered field D2 of the second even-numbered frame EVEN2, so that a fifth intermediate image IMI5 is acquired from the second sensing section S2 connected to the even-numbered sensing gate lines GL2 to GL30. The fifth intermediate image IMI5 is generated according to a fourth accumulated light amount accumulated during the first even-numbered field C2 of the even-numbered frame EVEN2 of the third frame FRAME3 after the first sensing element TR12 or the second sensing element TR22 of the second sensing section S2 is turned on.

An internal light or an external light is sensed during the first even-numbered field C2 of the second even-numbered frame EVEN2 to generate the fifth intermediate image IMI5. For example, for the convenience of the explanation, in one exemplary embodiment the first even-numbered field C2 of the second even-numbered frame EVEN2 is defined as an eighth interval.

Since the light source blocks LB are turned on during the eighth interval, the light amount corresponding to internal light and external light during the eight interval may be accumulated in the first capacitor C1 of the second sensing section.

Thus, a fourth accumulated light amount accumulated in the first capacitor C1 during the eight interval may be defined as a light accumulation of (1×the external light)+a light accumulation of (1×the internal light). The second even area EVEN_A2 of the fifth intermediate image IMI5 is divided into a sixth touch area LED6 and a sixth non-touch area AMB6. The sixth touch area LED6 may have a light accumulation of (1×the internal light) and the sixth non-touch area AMB6 may have a light accumulation of (1×the external light).

Figure 8C:
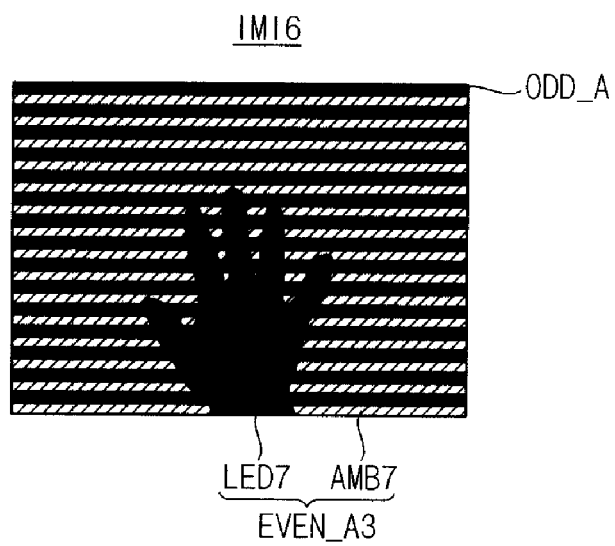

Referring to FIGS. 6A and 8C, a fourth intermediate value IMV4 may be calculated by subtracting the fourth accumulated light amount from the third accumulated light amount. The fourth intermediate value IMV4 is a light accumulation of (2×the external light). A fifth intermediate value IMV5 may be calculated by dividing the fourth intermediate valued IMV4 in half (by 2). The fifth intermediate value IMV5 may be defined as (1×the external light). A third even area EVEN_A3 of the sixth intermediate image IMI6 according to the fifth intermediate value IMV5 is divided into a seventh touch area LED7 and a seventh non-touch area AMB7. The seventh touch area LED7 has a light accumulation of (0×the internal light)+a light accumulation of (0×the external light), and the seventh non-touch area AMB7 has a light accumulation of (1×the external light).

Figure 8D:
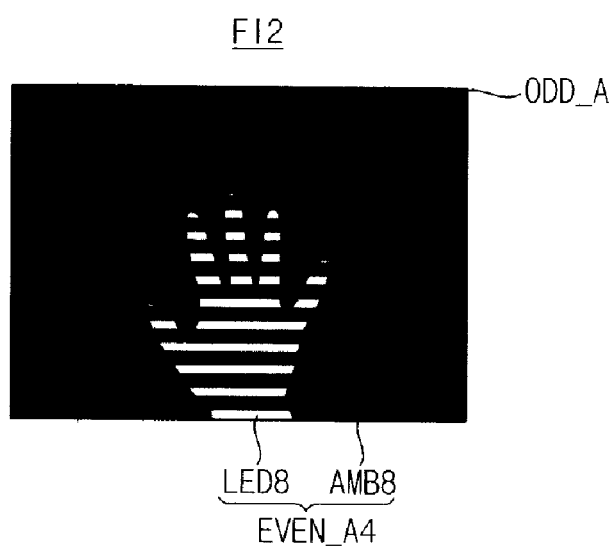

Referring to FIGS. 6A and 8D, a sixth intermediate value IMV6 may be calculated by subtracting the sixth intermediate image IMI6 from the fourth accumulated light amount. The sixth intermediate value IMV6 may be defined as a light accumulation of (1×the internal light). Thusly, the sixth intermediate value IMV6 is generated in response to the light that includes only the internal light and excludes the external light. A fourth even area EVEN_A4 of a second final image F12 generated according to the sixth intermediate value IMV6 is divided into an eighth touch area LED8 and an eighth non-touch area AMB8. The eighth touch area LED8 has a light accumulation of (1×the internal light), and the eighth non-touch area AMB8 has a light accumulation of (1×the internal light)+(0×the external light)); only there was no internal light accumulation in the eighth non-touch area AMB8, so the area appears blank.

Thus, the second touch information removing the external light may be acquired using the third accumulated light amount and the fourth accumulated light amount during the even-numbered frame EVEN.

Therefore, the first touch information based on the driving of the odd-numbered sensing gate lines, e.g., GL1, GL3, . . . , GL1077 and GL1079, during the second odd-numbered frame ODD2 and the second touch information based on the driving of the even-numbered sensing gate lines, e.g., GL2, GL4, . . . , GL1078 and GL1080, during the second even-numbered frame EVEN2 are combined, so that the touch image is detected. Specifically, the first and second final images are combined to produce a combined final image.

According to the present exemplary embodiment, the touch image from which external light is removed may be detected using the first touch information acquired by the first sensing elements connected to the odd-numbered sensing gate lines, e.g., GL1, GL3, . . . , GL1077 and GL1079 and the second touch information acquired by the second sensing elements connected to the even-numbered sensing gate lines, e.g., GL2, GL4, . . . , GL1078 and GL1080.

Figure 9:
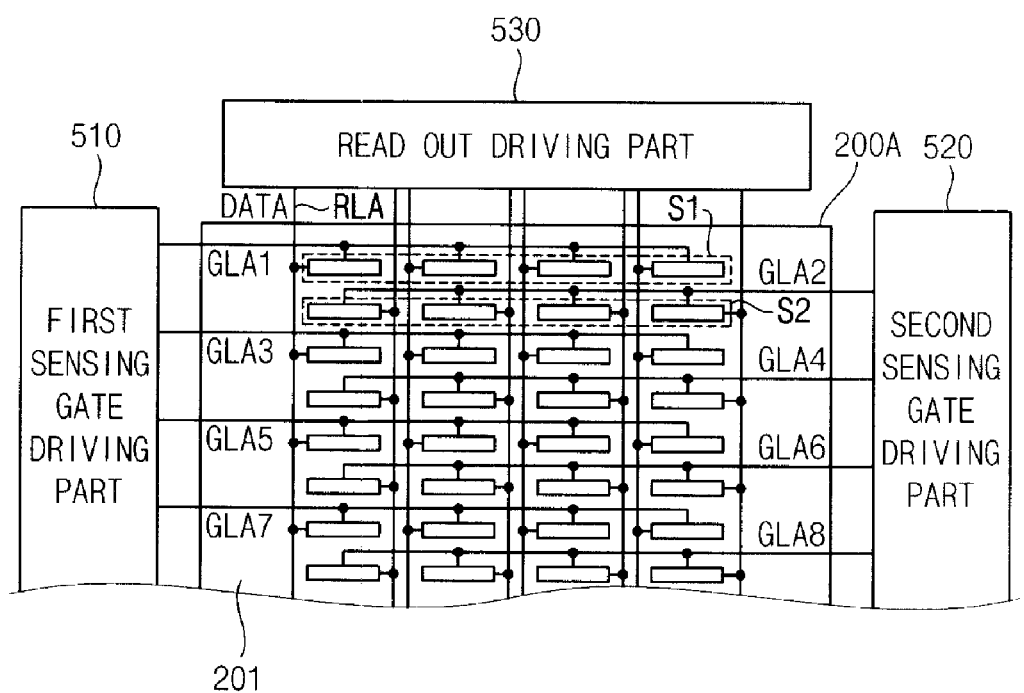
FIG. 9 is a block diagram illustrating another exemplary embodiment of a touch substrate according to the present invention.
Figure 9:
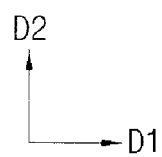

FIG. 9 is a block diagram illustrating another embodiment of a touch substrate according to the present invention.

The present exemplary embodiment of a display apparatus is substantially similar to the previous exemplary embodiment of a display apparatus illustrated in FIG. 1 except that each of the sensing gate lines GL of the touch substrate 200A is individually connected to a first sensing gate driving part 510 or a second sensing gate driving part 520, and therefore the same reference numerals will be used to refer to the same or like parts as those described in previous exemplary embodiment of FIG. 1 and any further explanation concerning the above elements will be omitted.

Referring to FIGS. 1 and 9, the present exemplary embodiment of a display apparatus includes a touch display panel 1100, a timing control part 350, a light source part 400, a light source driving part 450, a sensing driving section 500 and a touch image detecting section 600. The touch display panel 1100 includes a display substrate 100 and a touch substrate 200A.

The touch substrate 200A includes a first sensing section S1, a second sensing section S2, a first sensing gate driving part 510, a second sensing gate driving part 520, a read out driving part 530, a plurality of sensing gate lines GLA and a plurality of read out lines RLA.

The first sensing section S1 is connected to odd-numbered gate lines, e.g., GLA1, GLA3, . . . , GLA1077 and GLA1079, of the sensing gate lines GLA. The first sensing section S1 includes a first sensing element part SS1 and a second sensing element part SS2. Similar to the configuration shown in FIG. 4, the first sensing element part SS1 includes a first switching element TR11, a first sensing element TR12 and a first capacitor C1. Similar to the configuration shown in FIG. 4, the second sensing element part SS2 includes a second switching element TR21, a second sensing element TR22 and a second capacitor C2.

The second sensing section S2 is connected to even-numbered gate lines, e.g., GLA2, GLA4, . . . , GLA1078 and GLA1080, of the sensing gate lines GLA. The second sensing section S2 includes the first sensing element part SS1 and the second sensing element part SS2. The first sensing element part SS1 includes a first switching element TR11, a first sensing element TR12 and a first capacitor C1. The second sensing element part SS2 includes a second switching element TR21, a second sensing element TR22 and a second capacitor C2. That is, the first and second sensing element parts SS1 and SS2 are alternately disposed in each of a row direction and a column direction.

The sensing driving section 500 includes a first sensing gate driving part 510, a second sensing gate driving part 520 and a read out driving part 530. The first and second sensing gate driving parts 510 and 520 may be formed on the touch substrate 200A in the form of a chip or other similar configuration. In addition, the first and second sensing gate driving parts 510 and 520 may be formed on the touch substrate 200A in ASG form while the sensing gate lines GLA are formed on the touch substrate 200A.

The first sensing gate driving part 510 is connected to the odd-numbered sensing gate lines, e.g., GLA1, GLA3, . . . , GLA1077 and GLA1079, of the sensing gate lines. The first sensing gate driving part 510 sequentially activates the odd-numbered sensing gate lines, e.g., GLA1, GLA3, . . . , GLA1077 and GLA1079, during an odd-numbered frame. For example, in one exemplary embodiment the first sensing gate driving part 510 sequentially activates the odd-numbered sensing gate lines, e.g.,. GLA1, GLA3, . . . , GLA1077 and GLA1079, during a first period of the odd-numbered frame. In addition, the first sensing gate driving part 510 sequentially activates the odd-numbered sensing gate lines, e.g.,. GLA1, GLA3, . . . , GLA1077 and, GLA1079, during a second period of the odd-numbered frame. The first sensing gate driving part 510 activates the odd-numbered sensing gate lines, e.g., GLA1, GLA3, . . . , GLA1077 and GLA1079, twice during the odd-numbered frame.

For example, each of the odd-numbered sensing gate lines, e.g.,. GLA1, GLA3, . . . , GLA1077 and GLA1079, is directly and individually connected to the first sensing gate driving part 510. The first sensing gate driving part 510 sequentially activates each of the odd-numbered sensing gate lines, e.g., GLA1, GLA3, . . . , GLA1077 and GLA1079.

The second sensing gate driving part 520 is connected to the even-numbered sensing gate lines, e.g., GLA2, GLA4, . . . , GLA1078 and GLA1080, of the sensing gate lines. The second sensing gate driving part 520 sequentially activates the even-numbered sensing gate lines, e.g., GLA2, GLA4, . . . , GLA1078 and GLA1080, during an even-numbered frame. For example, in one exemplary embodiment the second sensing gate driving part 520 sequentially activates the even-numbered sensing gate lines, e.g., GLA2, GLA4, . . . , GLA1078 and GLA1080, during a first period of the even-numbered frame. In addition, the second sensing gate driving part 520 sequentially activates the even-numbered sensing gate lines, e.g., GLA2, GLA4, . . . , GLA1078 and GLA1080, during a second period of the even-numbered frame. The second sensing gate driving part 520 activates the even-numbered sensing gate lines, e.g., GLA2, GLA4, . . . , GLA1078 and GLA1080, twice during the even-numbered frame.

For example, each of the even-numbered sensing gate lines GLA2, GLA4, . . . , GLA1078 and GLA1080 is directly connected to the second sensing gate driving part 520. The second sensing gate driving part 520 sequentially activates each of the even-numbered sensing gate lines GLA2, GLA4, . . . , GLA1078 and GLA1080.

As described above, the present exemplary embodiment of a display apparatus according to the present invention is driven in the interlaced driving method in which the odd-numbered sensing gate lines, e.g., GLA1, GLA3, . . . , GLA1077 and GLA1079, are sequentially driven by the first sensing gate driving part 510 during the odd-numbered frame and then the even-numbered sensing gate lines, e.g., GLA2, GLA4, . . . , GLA1078 and GLA1080, are sequentially driven by the second sensing gate driving part 520 during the even-numbered frame.

The read out driving part 530 is connected to the read out lines RLA. The read out driving part 530 reads out light amounts sensed by each of the first sensing elements and the second sensing elements. The read out driving part 530 reads out a first light amount sensed by the first sensing section S1 during the odd-numbered frame. For example, the read out driving part 530 reads out a first accumulated light amount sensed by the first sensing section S1 during the first period of the odd-numbered frame and a second accumulated light amount sensed by the first sensing section S1 during the second period of the odd-numbered frame. The read out driving part 530 reads out a second light amount sensed by the second sensing section S2 during the even-numbered frame. For example, the read out driving part 530 reads out a third accumulated light amount sensed by the second sensing section S2 during the first period of the even-numbered frame and a fourth accumulated light amount sensed by the second sensing section S2 during the second period of the even-numbered frame.

Figure 10A:
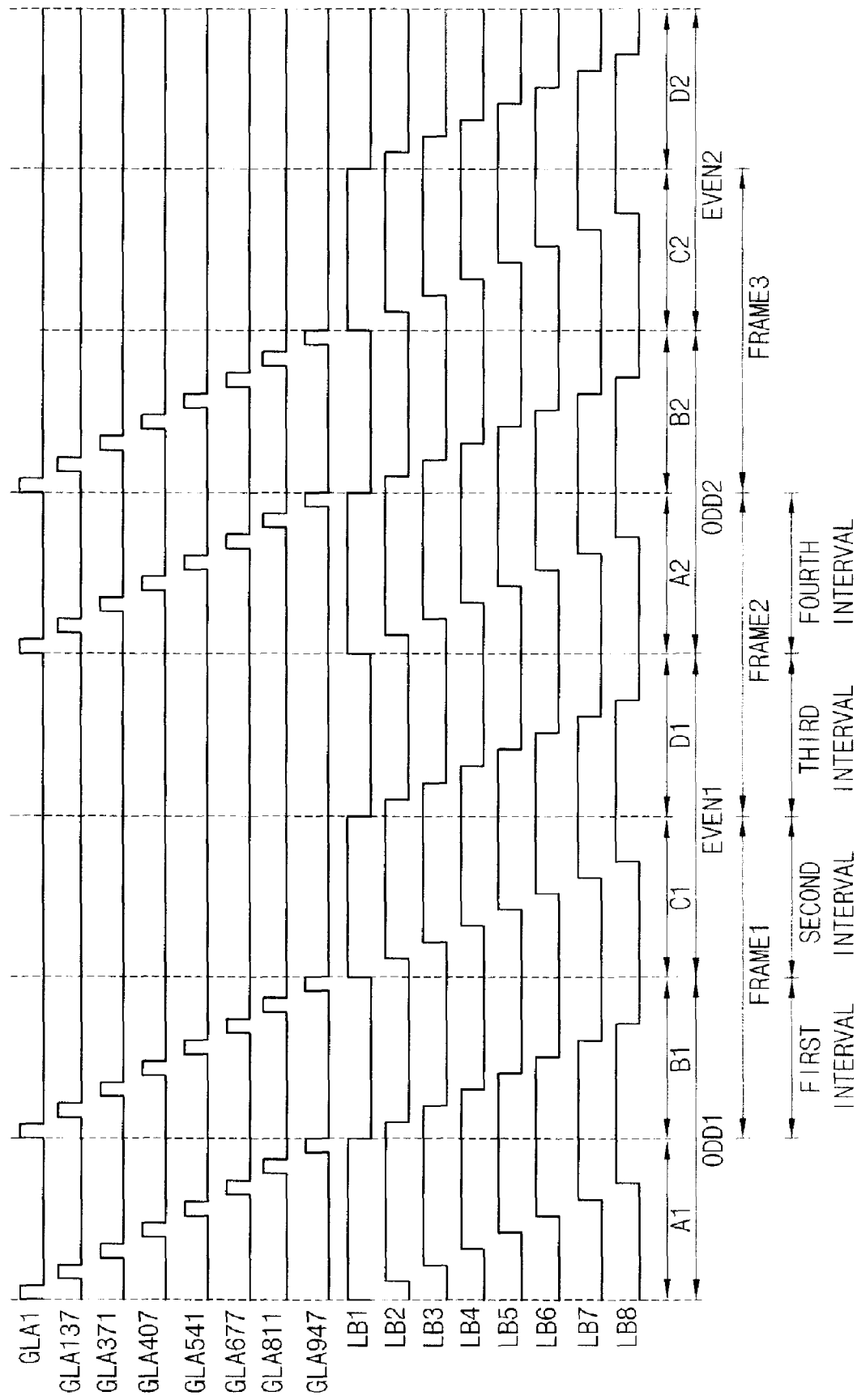
FIG. 10A is a timing diagram illustrating an exemplary embodiment of a method of detecting a first touch information by the display apparatus of FIG. 9, during an odd-numbered frame.

FIG. 10A is a timing diagram explaining an exemplary embodiment of a method of detecting a first touch information using the exemplary embodiment of a display apparatus of FIG. 9 during an odd-numbered frame.

Figure 10B:
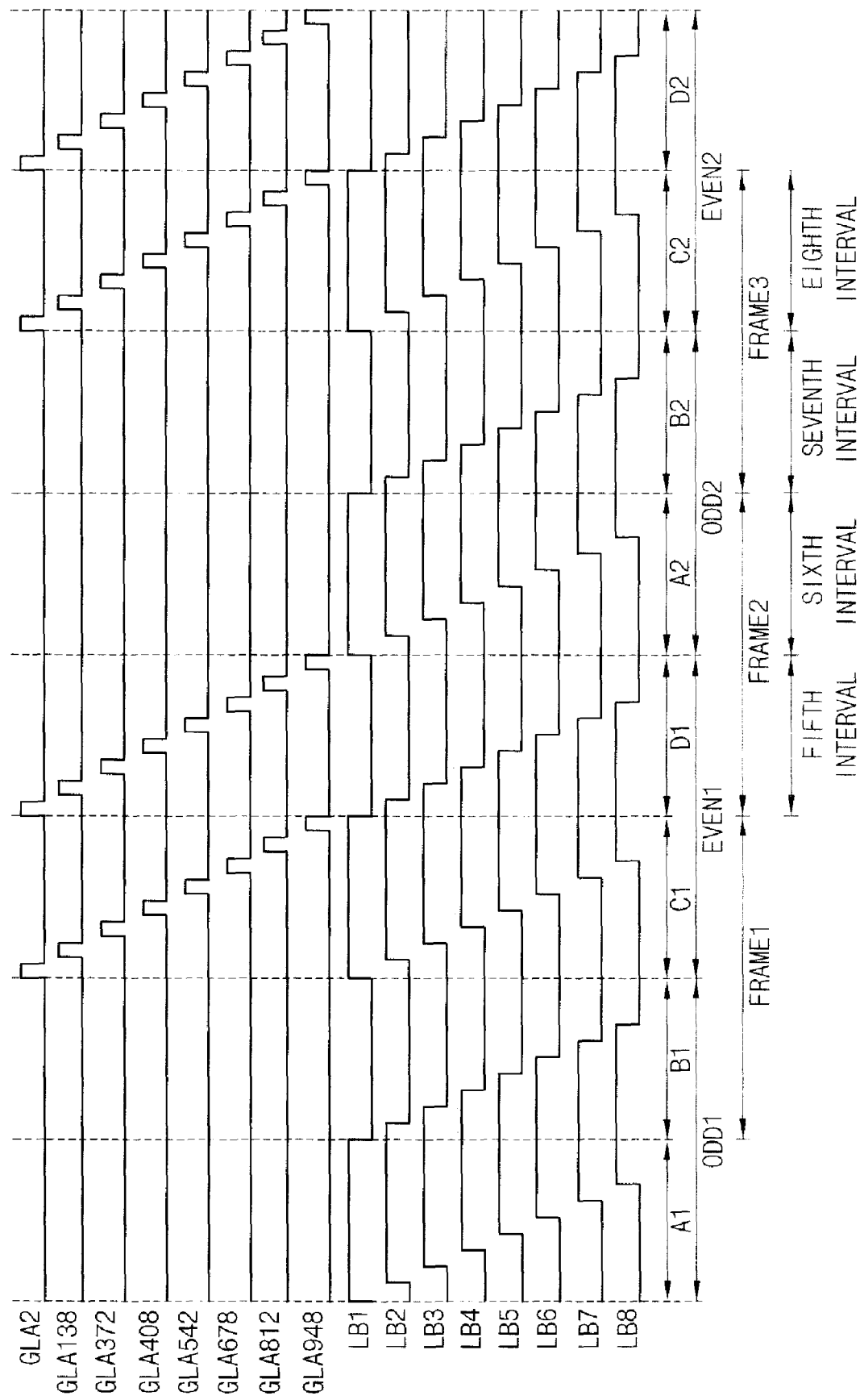
FIG. 10B is a timing diagram illustrating an exemplary embodiment of a method of detecting a second touch information by the display apparatus of FIG. 9, during an even-numbered frame.

In the exemplary embodiment discussed with respect to FIGS. 10A and 10B, the number of the sensing gate lines GLA is 1080, although alternative exemplary embodiments may include configurations wherein the number of gate lines GLA is different.

Referring to FIGS. 9 and 10A, a method of detecting a first touch information, which is a portion of the touch image during the odd-numbered frame ODD, will be explained. For the convenience of explanation, the odd-numbered frame ODD may include a first odd-numbered frame ODD1 and a second odd-numbered frame ODD2. Each of the first and second odd-numbered frames ODD1 and ODD2 may include a first odd-numbered field A and a second odd-numbered field B, similar to the previously described exemplary embodiments. Thus, the first odd-numbered frame ODD1 includes a first odd-numbered field A1 and a second odd-numbered field B1 and the second odd-numbered frame ODD2 includes a first odd-numbered field A2 and a second odd-numbered field B2. The first odd-numbered field A is a period in which the odd-numbered sensing gate lines GLA1, GLA3, . . . , GLA1077 and GLA1079 are firstly driven, and the second odd-numbered field B is a period in which the odd-numbered sensing gate lines GLA1, GLA3, . . . , GLA1077 and GLA1079 are secondly driven.

Firstly, an operation of the first odd-numbered field A will be explained.

When the first sensing gate line GLA1 of the odd-numbered sensing gate lines GLA1, GLA3, . . . , GLA1077 and GLA1079 is turned on, a first light source block LB1 corresponding to the first sensing gate line GLA1 is turned on. The first light source block LB1 maintains a turned-on state from a first time when the first sensing gate line GLA1 is turned on to a second time when the first sensing gate line GLA1 is turned on again in the second odd-numbered field B of the same odd-numbered frame ODD.

Each of the third to the hundred-thirty-fifth sensing gate lines GLA3 to GLA135 of the odd-numbered sensing gate lines GLA1, GLA3, . . . , GLA1077 and GLA1079 are sequentially turned on.

When the hundred-thirty-seventh sensing gate line GLA137 of the odd-numbered sensing gate lines GLA1, GLA3, . . . , GLA1077 and GLA1079 is turned on, a second light source block LB2 corresponding to the hundred-thirty-seventh sensing gate line GLA137 is turned on. The second light source block LB2 maintains the turned-on state from a first time when the hundred-thirty-seventh sensing gate line GLA137 is turned on to a second time when the hundred-thirty-seventh sensing gate line GLA137 is turned on again in the second odd-numbered field B of the same odd-numbered frame ODD.

Each of the hundred-thirty-ninth to the three-hundred-sixty-ninth sensing gate lines GLA139 to GLA369 of the odd-numbered sensing gate lines GLA1, GLA3, . . . , GLA1077 and GLA1079 is sequentially turned on.

Remaining odd-numbered sensing gate lines GLA371, GLA373, . . . GLA1077 and GLA1079 corresponding to the third light source block LB3 to the eighth light source block LB8 are sequentially driven. Since the method of driving the remaining odd-numbered sensing gate lines GLA371, GLA373, . . . GLA1077 and GLA1079 is substantially similar to the above-mentioned method of driving the first to the three-hundred-sixty-ninth odd-numbered sensing gate lines GLA1, GLA3, . . . GLA367 and GLA369, any further explanation concerning the above remaining odd-numbered sensing gate lines GLA371, GLA373, . . . GLA1077 and GLA1079 will be omitted.

Thus, the first accumulated light amount sensed by the first sensing elements connected to the odd-numbered sensing gate lines GLA1, GLA3, . . . , GLA1077 and GLA1079 may be read out in the first odd-numbered field A of the odd-numbered frame ODD.

Hereinafter, an operation of the second odd-numbered field B will be explained.

When the first sensing gate line GLA1 is turned on again, the first light source block LB1 corresponding to the first sensing gate line GLA1 is turned off as mentioned above. The first light source block LB1 maintains a turned-off state from a first time when the first sensing gate line GLA1 is turned on to a second time when the first sensing gate line GLA1 is turned on again in a subsequent odd-numbered frame ODD.

Each of the third to the hundred-thirty-fifth sensing gate lines GLA1 to GLA135 of the odd-numbered sensing gate lines GLA1, GLA3, . . . , GLA1077 and GLA1079 is sequentially turned on.

When the hundred-thirty-seventh sensing gate line GLA137 is turned on again, the second light source block LB2 corresponding to the hundred-thirty-seventh sensing gate line GLA137 is turned off. The second light source block LB2 maintains the turned-off state from a first time when the hundred-thirty-seventh sensing gate line GLA137 is turned on to a second time when the hundred-thirty-seventh sensing gate line GLA137 is turned on again in the subsequent odd-numbered frame ODD.

Each of the hundred-thirty-ninth to the three-hundred-sixty-ninth sensing gate lines GLA139 to GLA369 of the odd-numbered sensing gate lines GLA1, GLA3, . . . , GLA1077 and GLA1079 is sequentially turned on.

The remaining odd-numbered sensing gate lines GLA371, GLA373, . . . , GLA1077 and GLA1079 corresponding to the third light source block LB3 to the eighth light source block LB8 are sequentially driven. Since the method of driving the remaining odd-numbered sensing gate lines GLA371, GLA373, . . . , GLA1077 and GLA1079 is substantially similar to the above-mentioned method of driving the first to the three-hundred-sixty-ninth odd-numbered sensing gate lines GLA1, GLA3, . . . , GLA367 and GLA369, any further explanation concerning the above remaining odd-numbered sensing gate lines GLA371, GLA373, . . . , GLA1077 and GLA1079 will be omitted.

Thus, the second accumulated light amount sensed by the first sensing elements connected to the odd-numbered sensing gate lines GLA1, GLA3, . . . , GLA1077 and GLA1079 may be read out in the second odd-numbered field B of the odd-numbered frame ODD.

FIG. 10B is a timing diagram explaining a method of detecting a second touch information using the display apparatus of FIG. 9 during an even-numbered frame.

Referring to FIGS. 9 and 10B, an exemplary embodiment of a method of detecting a second touch information, which is a portion of the touch image during the even-numbered frame EVEN, will be explained. For the convenience of explanation, the even-numbered frame EVEN may include a first even-numbered frame EVEN1 and a second even-numbered frame EVEN2. Each of the first and second even-numbered frames EVEN1 and EVEN2 may include a first even-numbered field C and a second even-numbered field D. Thus, the first even-numbered frame EVEN1 includes a first even-numbered field C1 and a second even-numbered field D1 and the second even-numbered frame EVEN2 includes a first even-numbered field C2 and a second even-numbered field D2. The first even-numbered field C is a period in which the even-numbered sensing gate lines GLA2, GLA4, . . . , GLA1078 and GLA1080 are firstly driven, and the second even-numbered field D is a period in which the even-numbered sensing gate lines GLA2, GLA4, . . . , GLA1078 and GLA1080 are secondly driven.

First, an operation of the first even-numbered field C will be explained in detail.

When the second sensing gate line GLA2 of the even-numbered sensing gate lines GLA2, GLA4, . . . , GLA1078 and GLA1080 is turned on, the first light source block LB1 corresponding to the second sensing gate line GLA2 is turned on. The first light source block LB1 maintains a turned-on state from a first time when the second sensing gate line GLA2 is turned on to a second time when the second sensing gate line GLA2 is turned on again in the second even-numbered field D of the current even-numbered frame EVEN.

Each of the fourth to the hundred-thirty-sixth sensing gate lines GLA4 to GLA136 of the even-numbered sensing gate lines GLA2, GLA4, ..., GLA1078 and GLA1080 are sequentially turned on.

When the hundred-thirty-eighth sensing gate line GLA138 of the even-numbered sensing gate lines GLA2, GLA4, ..., GLA1078 and GLA1080 is turned on, the second light source block LB2 corresponding to the hundred-thirty-sixth sensing gate line GLA138 is turned on. The second light source block LB2 maintains a turned-on state from a first time when the hundred-thirty-sixth sensing gate line GLA138 is turned on to a second time when the hundred-thirty-sixth sensing gate line GLA138 is turned on again in the second even-numbered field D of the current even-numbered frame EVEN.

Each of the hundred-fortieth to the three-hundred-seventieth sensing gate lines GLA140 to GLA370 of the even-numbered sensing gate lines GLA2, GLA4, ..., GLA1078 and GLA1080 are sequentially turned on.

Remaining even-numbered sensing gate lines GLA372, GLA374, ..., GLA1078 and GLA1080 corresponding to the third light source block LB3 to the eighth light source block LB8 are sequentially driven. Since the method of driving the remaining even-numbered sensing gate lines GLA372, GLA374, ..., GLA1078 and GLA1080 is substantially similar to the above-mentioned method of driving the second to the three-hundred-seventieth even-numbered sensing gate lines GLA2, GLA4, ..., GLA368 and GLA370, any further explanation concerning the above remaining even-numbered sensing gate lines GLA372, GLA374, ..., GLA1078 and GLA1080 will be omitted.

Thus, the third accumulated light amount sensed by the second sensing elements connected to the even-numbered sensing gate lines GLA2, GLA4, ..., GLA1078 and GLA1080 may be read out in the first even-numbered field C of the even-numbered frame EVEN.

Hereinafter, an operation of the second even-numbered field D will be explained in detail.

When the second sensing gate line GLA2 is turned on again, the first light source block LB1 corresponding to the second sensing gate line GLA2 is turned off The first light source block LB1 maintains a turned-off state from a first time when the second sensing gate line GLA2 is turned on to a second time when the second sensing gate line GLA2 is turned on again in the subsequent even-numbered frame EVEN.

Each of the fourth to the hundred-thirty-sixth sensing gate lines GLA4 to GLA136 of the even-numbered sensing gate lines GLA2, GLA4, ..., GLA1078 and GLA1080 is sequentially turned on.

When the hundred-thirty-eighth sensing gate line GLA138 is turned on, the second light source block LB2 corresponding to the hundred-thirty-sixth sensing gate line GLA138 is turned off. The second light source block LB2 maintains a turned-off state from a first time when the hundred-thirty-sixth sensing gate line GLA138 is turned on to a second time when the hundred-thirty-sixth sensing gate line GLA138 is turned on again in the next even-numbered frame EVEN.

Each of the hundred-fortieth to the three-hundred-seventieth sensing gate lines GLA140 to GLA370 of the even-numbered sensing gate lines GLA2, GLA4, ..., GLA1078 and GLA1080 is sequentially turned on.

Remaining even-numbered sensing gate lines GLA372, GLA374, ..., GLA1078 and GLA1080 corresponding to the third light source block LB3 to the eighth light source block LB8 are sequentially driven. Since the method of driving the remaining even-numbered sensing gate lines GLA372, GLA374, ..., GLA1078 and GLA1080 is substantially similar to the above-mentioned method of driving the second to the three-hundred-seventieth even-numbered sensing gate lines GLA2, GLA4, ..., GLA368 and GLA370, any further explanation concerning the above remaining even-numbered sensing gate lines GLA372, GLA374, ..., GLA1078 and GLA1080 will be omitted.

Thus, the fourth accumulated light amount sensed by the second sensing elements connected to the even-numbered sensing gate lines GLA2, GLA4, ..., GLA1078 and GLA1080 may be read out in the second even-numbered field D of the even-numbered frame EVEN.

The calculating of the first touch information using the first and second accumulated light amounts and the second touch information using the third and fourth accumulated light amounts according to the present exemplary embodiment is substantially similar to those according to the previous exemplary embodiment of FIG. 1, and thus any further explanation concerning the above method of calculating the first and second touch information will be omitted.

According to the present exemplary embodiment, the touch image from which external light is removed may be detected using the first touch information acquired by the first sensing elements connected to the odd-numbered sensing gate lines GLA1, GLA3, ..., GLA1077 and GLA1079 and the second touch information acquired by the second sensing elements connected to the even-numbered sensing gate lines GLA2, GLA4, ..., GLA1078 and GLA1080.

According to the present invention, sensed light amounts sensed by sensing elements driven in an interlaced method, in which odd-numbered sensing gate lines connected to the first sensing gate driving part are sequentially driven and then even-numbered sensing gate lines connected to the second sensing gate driving part are sequentially driven, are used, thereby reducing influences from external light.

The foregoing is illustrative of the present disclosure and is not to be construed as limiting thereof Although a few example embodiments of the present invention have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. Embodiments of the present invention are defined by the following claims, with equivalents of the claims to be included therein.

What is claimed is:

1. A method of detecting a touch image, the method comprising:
driving a light source to detect a first touch information corresponding to a first light amount sensed by a first sensing section connected to odd-numbered gate lines during an odd-numbered frame;
driving the light source to detect a second touch information corresponding to a second light amount sensed by a second sensing section connected to even-numbered gate lines, during an even-numbered frame; and detecting a touch image using the first touch information and the second touch information, wherein the odd-numbered gate lines and even-numbered gate lines are electrically independent of gate lines to display an image, wherein driving the light source to detect the first touch information comprises:

reading out a first accumulated light amount from the first sensing section during a first odd-numbered field of the odd-numbered frame while the light source is turned on;

reading out a second accumulated light amount smaller in magnitude than the first accumulated light amount from the first sensing section during a second odd-numbered field of the odd-numbered frame while the light source is turned off; and detecting the first touch information using the first accumulated light amount and the second accumulated light amount.

2. The method of claim 1, wherein reading out the first accumulated light amount comprises simultaneously reading out the first accumulated light amount from the first sensing section connected to two adjacent odd-numbered gate lines of the odd-numbered gate lines, and reading out the second accumulated light amount comprises simultaneously reading out the second accumulated light amount from the first sensing section connected to two adjacent odd-numbered gate lines of the odd-numbered gate lines.

3. The method of claim 1, wherein reading out the first accumulated light amount comprises reading out the first accumulated light amount from the first sensing section individually connected to individual gate lines of the odd-numbered gate lines, and reading out the second accumulated light amount comprises reading out the second accumulated light amount from the first sensing section individually connected to individual gate lines of the odd-numbered gate lines.

4. The method of claim 1, wherein driving the light source to detect the first touch information comprises:

converting the first accumulated light amount into a first accumulated light amount value having a digital value;

converting the second accumulated light amount into a second accumulated light amount value having a digital value; and calculating the first touch information using the first accumulated light amount and the second accumulated light amount.

5. The method of claim 1, wherein driving the light source to detect the second touch information comprises:

reading out a third accumulated light amount from the second sensing section during a first even-numbered field of the even-numbered frame while the light source is turned on;

reading out a fourth accumulated light amount smaller than the third accumulated light amount from the second sensing section during a second even-numbered field of the even-numbered frame while the light source is turned off; and detecting the second touch information using the third accumulated light amount and the fourth accumulated light amount.

6. The method of claim 5, wherein reading out the third accumulated light amount comprises simultaneously reading out the third accumulated light amount from the second sensing section connected to two adjacent even-numbered gate lines of the even-numbered gate lines, and reading out the fourth accumulated light amount comprises simultaneously reading out the fourth accumulated light amount from the second sensing section connected to two adjacent even-numbered gate lines of the even-numbered gate lines.

7. The method of claim 5, wherein reading out the first accumulated light amount comprises reading out the third accumulated light amount from the second sensing section individually connected to individual gate lines of the even-numbered gate lines, and reading out the fourth accumulated light amount comprises reading out the fourth accumulated light amount from the second sensing section individually connected to individual gate lines of the even-numbered gate lines.

8. The method of claim 5, wherein driving the light source to detect the second touch information further comprises:

converting the third accumulated light amount into a third accumulated light amount value having a digital value;

converting the fourth accumulated light amount into a fourth accumulated light amount value having a digital value; and calculating the second touch information using the first accumulated light amount and the second accumulated light amount.

9. The method of claim 1, wherein the first sensing section is separated from the second sensing section.

10. A display apparatus comprising:

a touch display panel comprising:

a display substrate which displays an image; and a touch substrate disposed substantially opposite the display substrate and having a first sensing section connected to odd-numbered gate lines thereof and a second sensing section connected to even-numbered gate lines thereof, the odd-numbered gate lines and even-numbered gate lines of the touch substrate are electrically independent of gate lines of the display substrate;

a light source comprising:

a light source part; and a light source driving part which drives the light source part during an odd-numbered frame and an even-numbered frame subsequent to the odd-numbered frame;

a sensing driving section which drives the odd-numbered gate lines during the odd-numbered frame to read out a first light amount sensed by the first sensing section, and which drives the even-numbered gate lines during the even-numbered frame to read out a second light amount sensed by the second sensing section; and a touch image detecting section which detects a first touch information corresponding to the first light amount, a second touch information corresponding to the second light amount, and which creates a touch image using the first touch information and the second touch information, wherein the sensing driving section comprises:

a first sensing gate driving part which drives the odd-numbered gate lines during the odd-numbered frame;

a second sensing gate driving part which drives the even-numbered gate lines during the even-numbered frame; and a read out driving part which reads out the first light amount from the first sensing section during the odd-numbered frame, and which reads out the second light amount form the second sensing section during the even-numbered frame, and the light source part turns on the light source during a first odd-numbered field of the odd-numbered frame, turns off the light source during a second odd-numbered field of the odd-numbered frame, turns on the light source during a first even-numbered field of the even-numbered frame, and turns off the light source during a second even-numbered field of the even-numbered frame.

11. The display apparatus of claim 10, wherein the read out driving part reads out a first accumulated light amount from the first sensing section when the light source is turned on during the first odd-numbered field of the odd-numbered frame, the read out driving part reads out a second accumulated light amount which is smaller in magnitude than the first light amount from the first sensing section when the light source is turned off during the second odd-numbered field of the odd-numbered frame, the read out driving part reads out a third accumulated light amount from the second sensing section when the light source is turned on during the first even-numbered field of the even-numbered frame, and the read out driving part reads out a fourth accumulated light amount smaller in magnitude than the third accumulated light amount from the sensing section when the light source is turned off during a second even-numbered field of the even-numbered frame.

12. The display apparatus of claim 11, wherein the touch image detecting section comprises:

a receiving part which receives the first to fourth accumulated light amounts from the read out driving part;

a digital converting part which converts the first to fourth accumulated light amounts into first to a fourth accumulated light amount values, respectively, each of which have digital values;

a calculation part which calculates the first touch information corresponding to the first light amount sensed by the first sensing section using the first accumulated light amount value and the second accumulated light amount value, and which calculates the second touch information corresponding to the second light amount sensed by the second sensing section using the third accumulated light amount value and the fourth accumulated light amount value; and a detecting part which detects the touch image by combining the first touch information with the second touch information.

13. The display apparatus of claim 12, wherein the touch image detecting section further comprises:

a first storage part which stores the first touch information; and a second storage part which stores the second touch information.

14. The display apparatus of claim 10, wherein the touch substrate further comprises a common line, and the common line commonly connects adjacent odd-numbered sensing gate lines and the first sensing gate driving part to simultaneously drive the adjacent odd-numbered sensing gate lines, and commonly connects adjacent even-numbered sensing gate lines and the second sensing gate driving part to simultaneously drive the adjacent even-numbered sensing gate lines.

15. The display apparatus of claim 10, wherein each of the odd-numbered sensing gate lines is connected to the first sensing gate driving part to be respectively sequentially driven, and each of the even-numbered sensing gate lines is sequentially connected to the second sensing gate driving part to be respectively driven.

16. The display apparatus of claim 10, wherein each of the first and second sensing sections comprises:

a first sensing element part comprising an infrared light sensor which senses an infrared light corresponding to an internally supplied light provided from the light source and an external light provided from an outside thereof, and a first capacitor which accumulates the internal light and the external light sensed by the infrared light sensor; and a second sensing element part comprising a visible light sensor which senses a visible light corresponding to the internally supplied light and the external light, and a second capacitor which accumulates the visible light sensed by the visible light sensor.

17. The display apparatus of claim 10, wherein the display substrate comprises a first substrate, a pixel switching element and an array layer.

18. The display apparatus of claim 10, wherein the first sensing section is separated from the second sensing section.

* * * * *